United States Patent [19]

Schneiderhan

[11] Patent Number: 5,067,088

[45] Date of Patent: Nov. 19, 1991

[54] APPARATUS AND METHOD FOR ASSEMBLING MASS MAIL ITEMS

[75] Inventor: Edward M. Schneiderhan, Glenview, Ill.

[73] Assignee: Johnson & Quin, Inc., Niles, Ill.

[21] Appl. No.: 481,480

[22] Filed: Feb. 16, 1990

[51] Int. Cl.$^5$ .................... G06F 15/20; B65H 39/02

[52] U.S. Cl. .................................... 364/478; 53/493; 53/284.3; 270/58; 358/93

[58] Field of Search ................ 364/478, 468, 131-134; 235/375; 270/54-58; 382/1, 11-15; 53/493, 494, 500, 501, 266 A; 358/93; 209/552, 584, 900

[56] References Cited

U.S. PATENT DOCUMENTS

| | | | |
|---|---|---|---|
| 3,842,402 | 10/1974 | Ett et al. | 382/39 X |
| 3,873,972 | 3/1975 | Levine | 382/14 X |
| 4,115,981 | 9/1978 | Hell et al. | 53/55 |
| 4,121,818 | 10/1978 | Riley et al. | 270/58 X |
| 4,299,073 | 11/1981 | Golicz et al. | 53/493 |
| 4,429,217 | 1/1984 | Hill et al. | 235/380 |
| 4,525,788 | 6/1985 | Gottlieb et al. | 364/478 |
| 4,527,790 | 7/1985 | Piotroski | 364/478 X |
| 4,547,856 | 10/1985 | Piotroski et al. | 364/478 |
| 4,574,692 | 3/1986 | Wahli | 270/55 |
| 4,707,790 | 11/1987 | Gomes et al. | 364/478 |
| 4,733,359 | 3/1988 | Luperti et al. | 364/478 |
| 4,739,606 | 4/1988 | Cantile | 53/493 |
| 4,753,430 | 6/1988 | Rowe et al. | 270/58 |
| 4,797,832 | 1/1989 | Axelrod et al. | 364/478 |
| 4,799,661 | 1/1989 | Nail | 235/470 X |
| 4,800,505 | 6/1989 | Axelrod et al. | 364/478 |
| 4,812,982 | 3/1989 | PeBenhofer | 364/478 |
| 4,831,657 | 5/1989 | Casey et al. | 382/37 X |
| 4,852,013 | 7/1989 | Durst, Jr. et al | 270/58 X |

*Primary Examiner*—Joseph Ruggiero
*Attorney, Agent, or Firm*—Neuman, Williams, Anderson & Olson

[57] ABSTRACT

A matching system for use with an inserting device adapted to insert into an envelope, which may be personalized for a particular recipient, one or more personalized inserts. The matching system ensures the proper assembly of mass mail items which include personalized components, each having an alpha-numeric sequence indicator printed thereon which corresponds to a given recipient. The matching system includes a number of video cameras, each positioned to sense an alpha-numeric sequence indicator on a different component of a mail item being assembled. The video camera create electrical signals in accordance with the sensed indicators which are processed by circuitry to develop and store digital representations of the sensed indicators. A controller, consisting of a master processing unit and a number of slave processing units, receives the stored digital representations and determines from them whether the sequence indicators on the personalized components to be assembled into a mass mail item match.

8 Claims, 22 Drawing Sheets

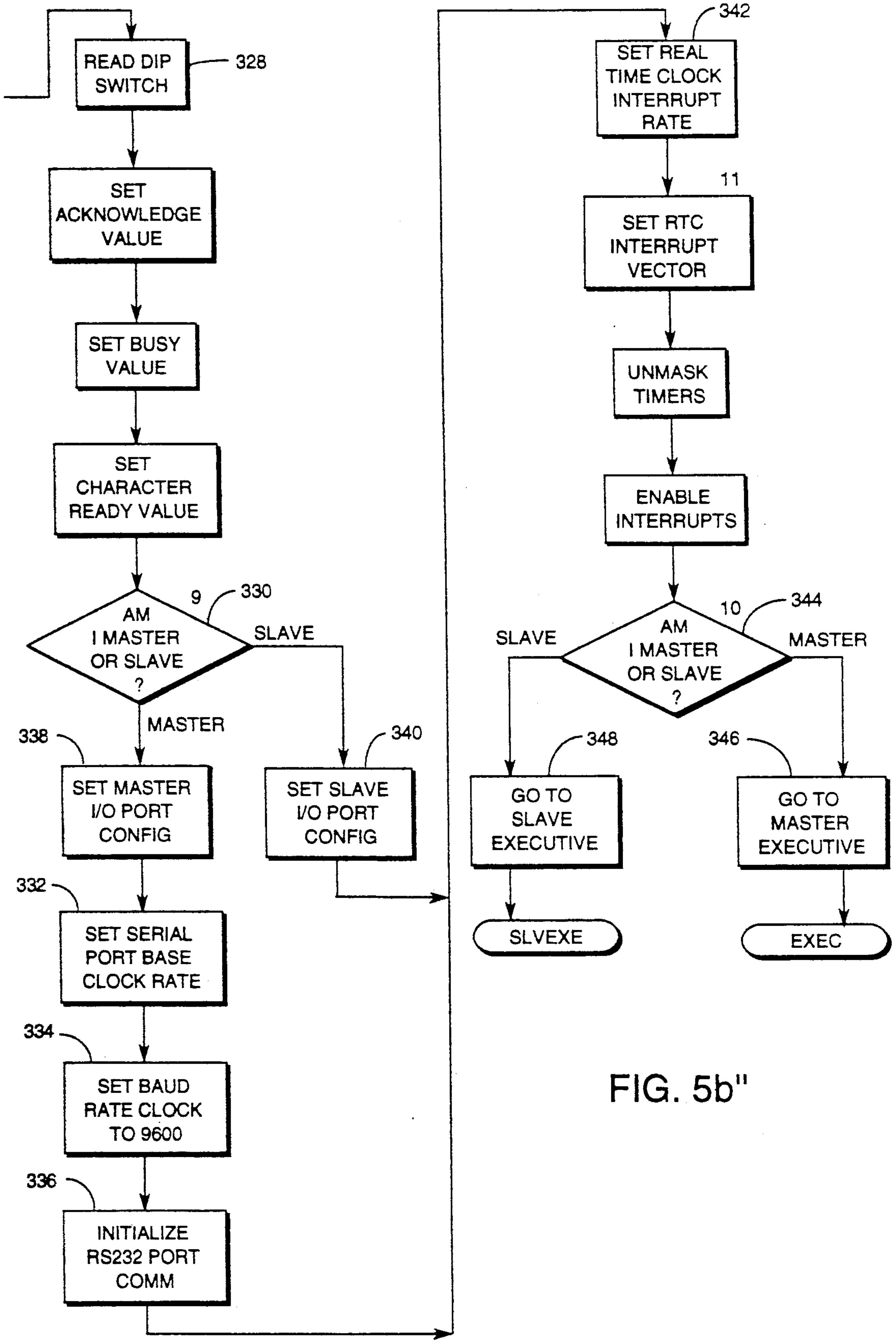
FIG. 5b"

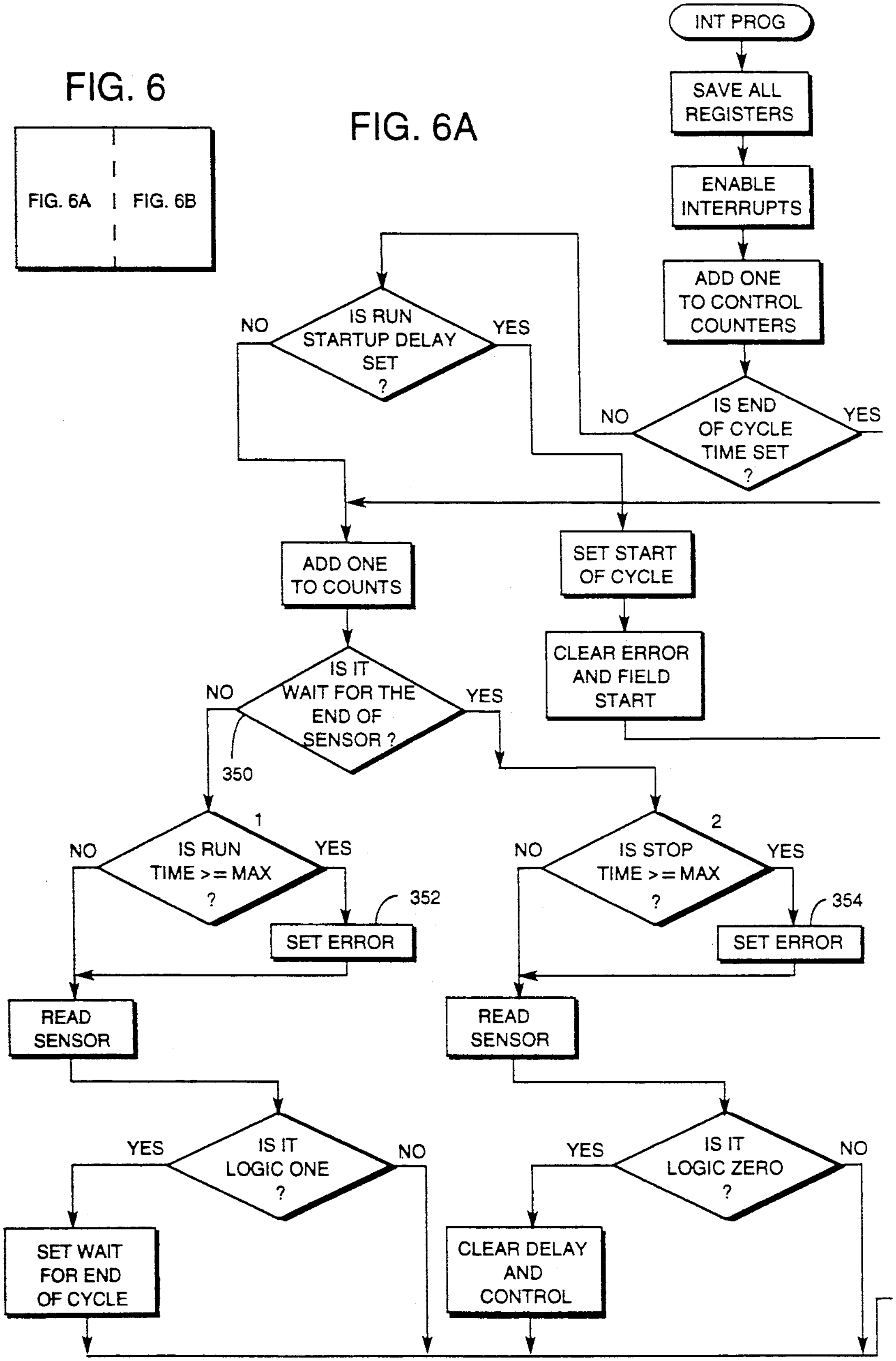
FIG. 6
FIG. 6A
FIG. 6B
FIG. 6A
INT PROG
SAVE ALL REGISTERS
ENABLE INTERRUPTS
ADD ONE TO CONTROL COUNTERS
IS END OF CYCLE TIME SET ?
NO
YES
IS RUN STARTUP DELAY SET ?
NO
YES
ADD ONE TO COUNTS
SET START OF CYCLE
CLEAR ERROR AND FIELD START
IS IT WAIT FOR THE END OF SENSOR ?
NO
YES
350
IS RUN TIME >= MAX ?
1
NO
YES
SET ERROR
352
IS STOP TIME >= MAX ?
2
NO
YES
SET ERROR
354
READ SENSOR
READ SENSOR
IS IT LOGIC ONE ?
YES
NO
IS IT LOGIC ZERO ?
YES
NO
SET WAIT FOR END OF CYCLE
CLEAR DELAY AND CONTROL

SLAVE CPU EXECUTIVE PROGRAM

SET UP START OF THE SEQUENCE NUMBER VIDEO AREA

DEFINE ACTIVE SLAVES AND READ DIRECTION

MASTER EXECUTIVE CALIBRATE, START LOCAT: AND SLAVE SETUP

FIG. 20
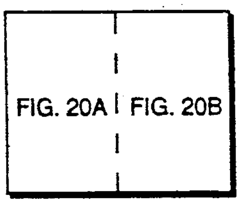
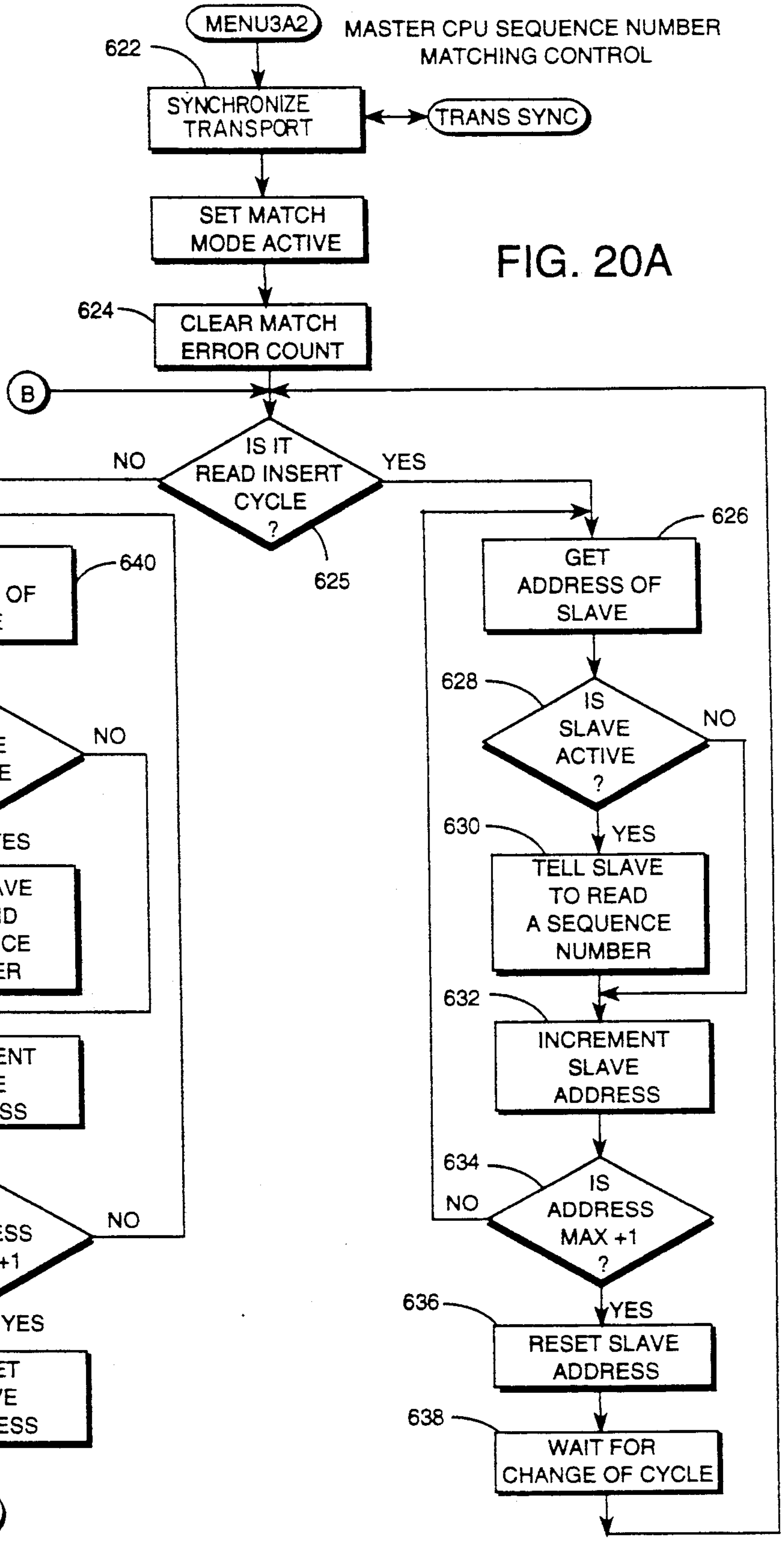
FIG. 20A

APPARATUS AND METHOD FOR ASSEMBLING MASS MAIL ITEMS

FIELD OF THE INVENTION

The present invention relates generally to mass mailing techniques. More particularly, the present invention provides an improved apparatus and method for assembling mass mail items.

BACKGROUND OF THE INVENTION

Mass mailings have long been referred to as "junk mail." Not surprisingly, recipients of such mailings have often been inclined to simply dispose of the mailings without even opening the envelopes. This situation has been disappointing to advertisers who routinely invest tremendous resources in mass mail advertising campaigns. The cost of a mass mail advertising campaign is usually justified by the customer response generated by the mailing. The situation described above is therefore particularly troubling to advertisers because recipients who altogether refuse to open the envelopes are certain to be non-responsive to the advertising campaign.

Accordingly, advertisers have tried to modify the external appearance of their mailings so that they would be less readily identifiable as such. For example, envelopes with glassine windows, through which the recipients' names and addresses appeared, have been replaced by more formal looking closed-faced envelopes, on which the names and addresses are printed. Also, advertisers have changed the contents of the mailings from unpersonalized brochures and the like to personalized letters and memoranda printed with the recipients' name and address and other personalized identifying information. The advent of high-speed laser printing has facilitated the creation of personalized inserts for mass mailings, making the overall aesthetics of the mailing very appealing to a recipient.

While aesthetically pleasing and personalized mass mailings have enjoyed a substantially higher customer response rate, the cost of preparing such mailings has been much more than unpersonalized mailings. The added cost has been due in large measure to the efforts expended to ensure that all personalized material for a given recipient is assembled into an envelope for that recipient. Conversely, the added cost has arisen from ensuring that personalized material for one recipient does not get mixed up with personalized material for another recipient. The added cost, for example, has been in the form of additional employees to manually verify proper collation, slower production, down-time and re-working costs when an assembly error is detected.

Various attempts to reduce the costs of personalized mailings have centered around electronically verifying that the personalized material intended for a given recipient is properly matched. For example, specialized markings such as bar codes or similar arrays of dots and dashes or the like have been printed on personalized envelopes and inserts for optical scanning to verify proper matching. This approach, while workable, has suffered from a number of shortcomings. First, the bar codes or markings degrade the aesthetics of the mailing, detracting from the benefits of having a personalized mailing in the first instance. Second, in the event of a mismatch in production, the bar codes or markings, which are not human-readable, provide no guidance to an operator whose task it is to re-work a sequence of mismatched items. Third, if an attempt is made to reduce the negative impact of a bar code or similar marking by reducing the size of the code or marking, then the same identifying mark would need to be reused periodically. For example, every sixteenth mail item would have the same identifying mark, which could result in a substantial amount of mismatched mail should an error in production occur.

SUMMARY OF THE INVENTION

Accordingly, it is a principal object of the present invention to provide an apparatus and method for assembling mass mail items that overcomes the shortcomings of the prior art.

More specifically, it is an object of the present invention to provide an apparatus and method for assembling personalized mass mail items that lowers cost, enhances productivity and increases the reliability of a mass mail operation.

Another object of the present invention is to provide for personalized mass mailings free of aesthetically degrading bar codes or other machine-only-readable markings.

A related object of the present invention is to facilitate correction of a mismatch occurring in the production of personalized mass mailings.

The foregoing and other objects are accomplished by providing a matching system for use with an inserting device adapted to insert into an envelope, which may be personalized, one or more personalized inserts, the matching system including a number of video cameras, each positioned to sense an alpha-numeric sequence indicator on a corresponding personalized envelope or insert and create an electrical signal in accordance with the sensed indicator, circuitry for processing the electrical signal from each camera to develop a digital representation of that signal and for storing the digital representation, and a controller for receiving the stored digital representations and for determining from them whether the sequence indicators on the personalized envelope and/or insert or inserts match. The alphanumeric sequence indicator corresponds to a given recipient and is printed on each personalized envelope and/or insert or inserts for that recipient. The alphanumeric sequence indicator, being human-readable, facilitates the correction of a mismatch in production because re-ordering of mail items can be accomplished based upon the indicator. Additionally, being human-readable, the sequence indicator blends into and does not detract from the aesthetics of a personalized insert, for example, in a manner not obtainable with a machine-only-readable code or marking.

BRIEF DESCRIPTION OF THE DRAWINGS

FIGS. 5*a*, 5*b*, 5*b*′, and 5*b*″ are flow diagrams illustrating operations performed by the present invention upon power up and initialization.

FIG. 6, including FIGS. 6A and 6B, is a flow diagram illustrating operations performed by the real time clock interrupt service routine aspect of the present invention.

FIG. 20, including FIGS. 20A and 20B, is a flow diagram illustrating operations performed by a master matching aspect of the present invention.

DETAILED DESCRIPTION

Figure 1:
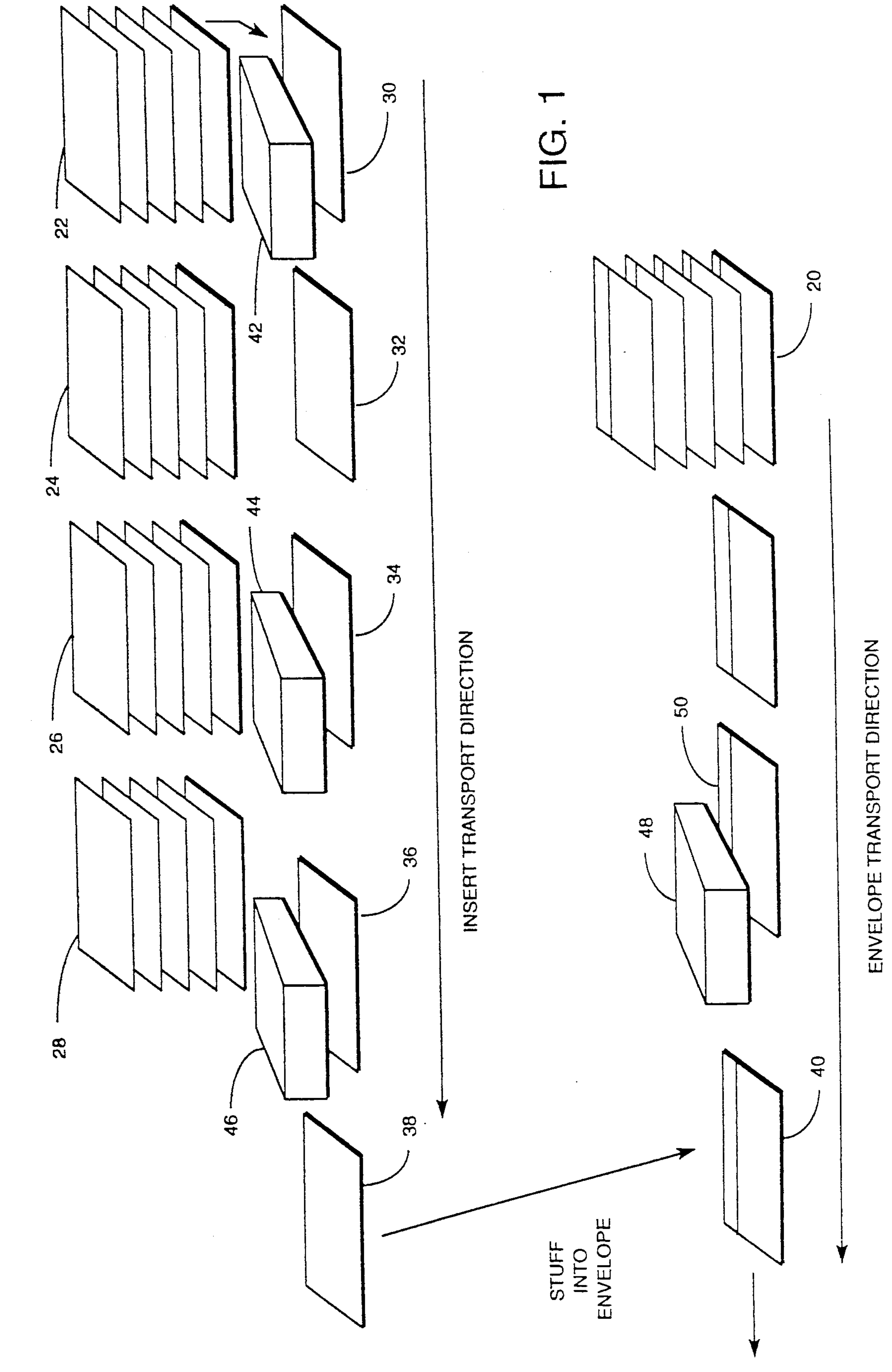
FIG. 1 is a schematic illustration of the mechanics of an inserting device usable with the present invention.

Referring now to the drawings, FIG. 1 schematically illustrates the mechanics of an inserting device usable with the present invention. The inserting device has a transport mechanism that receives a succession of envelopes from envelope stack 20. Additionally, the transport mechanism receives mail pieces or inserts from insert stacks 22, 24, 26 and 28. Each insert stack contains one type of insert such as a business return envelope, a letter, a note, etc. As described below, the transport mechanism operates to collate one item from each insert stack and insert the collated collection of inserts into an envelope FIG. 1 illustrates an inserting device for inserting four different mail pieces into each envelope For example, the inserts of insert stack 22 may be applications to apply for a credit card. The inserts of insert stack 24 may, for example, be business return envelopes. The inserts of insert stack 26 may, for example, be notes extolling the virtues of the particular credit card in question. Insert stack 28 may, for example, be letters describing the various features of the credit card in question.

In operation, the transport mechanism feeds an application from insert stack 22 to station 30. During the next transport cycle, the application from station 30 is moved to station 32 where a business return envelope from insert stack 24 is fed on top. During the next cycle of the transport, the business return envelope and application from station 32 are moved to station 34 and a note from insert stack 26 is fed on top. During the next cycle of the transport, the note, business return envelope and application from station 34 are moved to station 36 and a letter from insert stack 28 is fed on top. During the next cycle of the transport, the letter, note, business return envelope and application from station 36 are moved to station 38, from which they are stuffed into envelope 40 from envelope stack 20. The operation continues in this manner with each cycle of the transport resulting in another envelope being stuffed.

According to the invention, the inserting device thus described is fitted with video cameras 42, 44, 46 and 48. Video camera 42 is positioned to sense an alpha-numeric sequence indicator on the mail piece at station 30. Video camera 44 is positioned to sense an alpha-numeric sequence indicator on the top mail piece at station 34. Video camera 46 is positioned to sense an alpha-numeric sequence indicator on the top mail piece at station 36. The video camera 48 is positioned to sense an alpha-numeric sequence indicator on an envelope at station 50.

Figure 2:
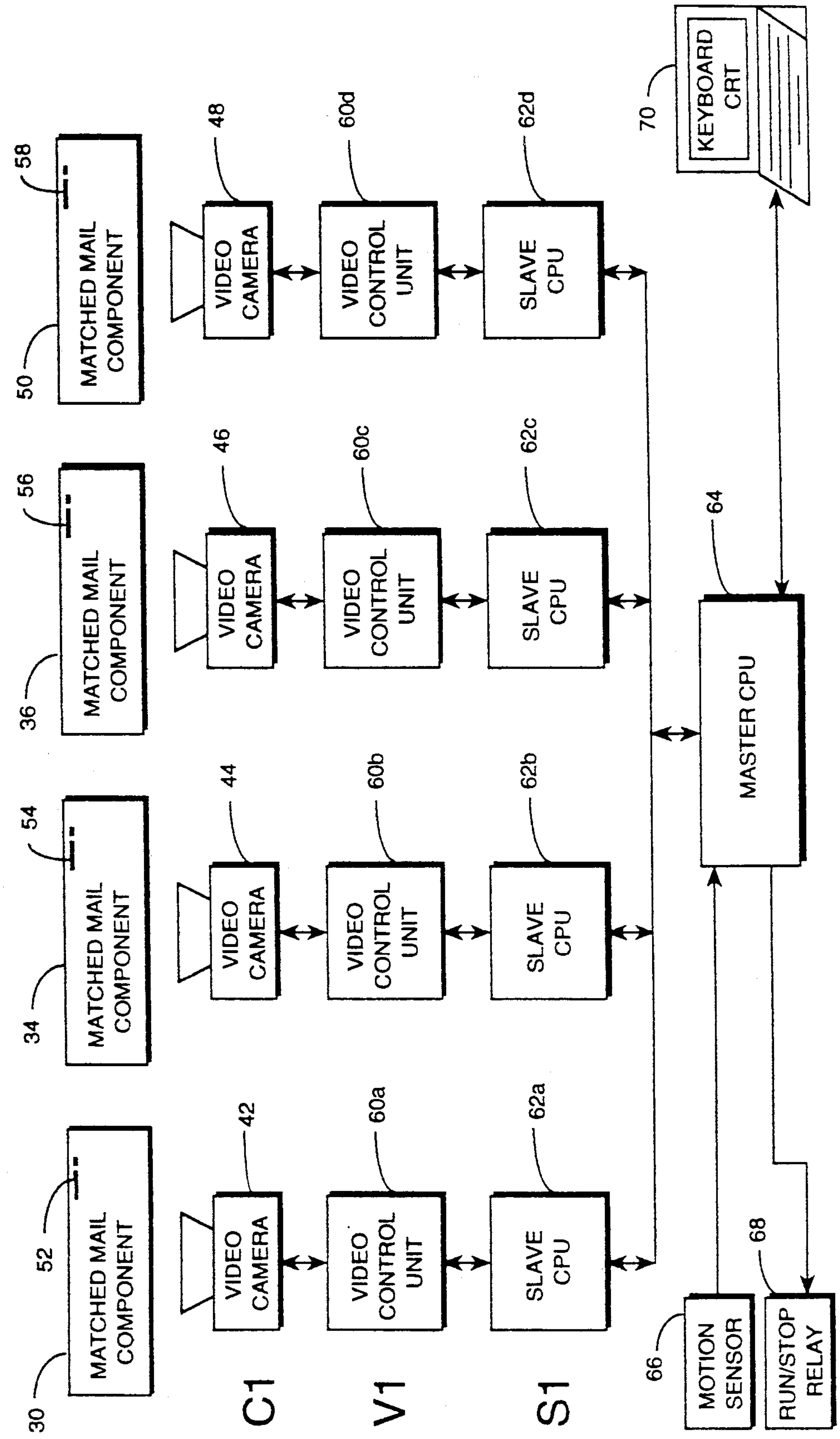
FIG. 2 is a schematic block diagram of an apparatus according to the present invention.

FIG. 2 is a schematic illustration of the matching system of the present invention usable with an inserting device such as the inserting device described above. Video camera 42 senses an alpha-numeric sequence indicator, shown schematically at 52, on the mail piece at station 30. Likewise, video cameras 44 and 46 respectively sense alpha-numeric sequence indicators 54 and 56 on the top mail pieces at stations 34 and 36. And video camera 48 senses alpha-numeric sequence indicator 58 on the envelope at station 50. Each video camera 42, 44, 46 and 48 creates an electrical signal in accordance with the sensed sequence indicator.

Digressing for a moment and with further reference to FIG. 1, the sequence indicators appear on those inserts which are personalized and/or the envelopes, if personalized. That is, the applications of insert stack 22 would be personalized, but the business return envelopes of insert stack 24 would not be personalized. Similarly, as shown in FIG. 1, the notes of insert stack 26 and the letters of insert stack 28 would be personalized, as would the envelopes of envelope stack 20. And by "personalized" it is meant that the mail pieces and/or envelopes are customized for each individual recipient. Being customized in such a manner, the envelopes may be printed with the recipient's name and address, the application from insert stack 22 may have the recipient's name and address printed thereon, the note from insert stack 26 may be personalized with the recipient's first name, for example, and the letter from insert stack 28 may similarly be personalized with the recipient's name and address. The alpha-numeric sequence indicators also printed on personalized pieces are designed to correspond to the intended recipients. That is, all inserts and/or an envelope personalized for a given recipient will have the same alpha-numeric sequence indicator. In the preferred embodiment, the ordering of recipients is done in a database in any suitable manner, such as alphabetically, by zip code, or by a sort intended to minimize postage costs. After the intended recipients are suitably sorted, each is assigned an alpha-numeric sequence indicator, and the indicators are assigned to be incrementally increasing according to the sorted order of recipients. Thus, while in production, the sequence indicators of the created mail items incrementally increase as production continues. Accordingly, should an error in collation or production occur, a reordering or reworking can be quickly accomplished based upon the sequence indicators, thereby minimizing downtime.

Returning now to FIG. 2, each video camera 42, 44, 46 and 48 creates an electrical signal in accordance with the alpha-numeric sequence indicator which it has sensed. Each video camera is coupled to a video control unit 60 that receives the electrical signal from that video camera and processes the electrical signal to develop and store a digital representation of that signal. The stored digital representations of the electrical signals created by the video cameras having sensed the respective sequence indicators are received by slave processors 62. Generally speaking, slave processors 62 receive the respective stored digital representations and determine from them the sequence indicators sensed by the respective video cameras. The slave processing units 62 are coupled to a master processing unit 64 which receives from the respective slave processing units 62 an identification of the sequence indicators sensed by the respective video cameras. The master processing unit 64 then determines from that information whether the sequence indicators on the personalized pieces being assembled into an item of mass mail match.

The master processing unit 64 is coupled to a motion sensor 66 which senses motion of the transport mechanism of the inserting device. Additionally, the master processing unit 64 is coupled to a run/stop relay 68 which is operative under control of the master processing unit 64 to enable and disable motion of the transport mechanism of the inserting device. Furthermore, the master processing unit 64 is coupled to a keyboard/CRT terminal 70 which is used for operator interface with the matching system of the present invention. As described hereinafter, the keyboard/CRT terminal 70 is also used for programming the processing units 62 and 64 while setting up for a mass mail production operation.

The video cameras of the matching system of the present invention are preferably constructed from charge coupled device (CCD) arrays. A two dimensional CCD array, such as the type used in home video cameras, may be used, or, as in the illustrated embodiment, self scan linear CCD arrays may be used. Using a two dimensional CCD array requires that the sequence indicator being sensed be stationary during sensing. On the other hand, using a linear CCD array requires that the sequence indicator being sensed be moving past the CCD array. The linear CCD is arranged so that its row of cells is perpendicular to the direction of transport motion. As described more fully hereinafter, the CCD array in this manner captures successive slices of video information passing past the array.

Figure 3:
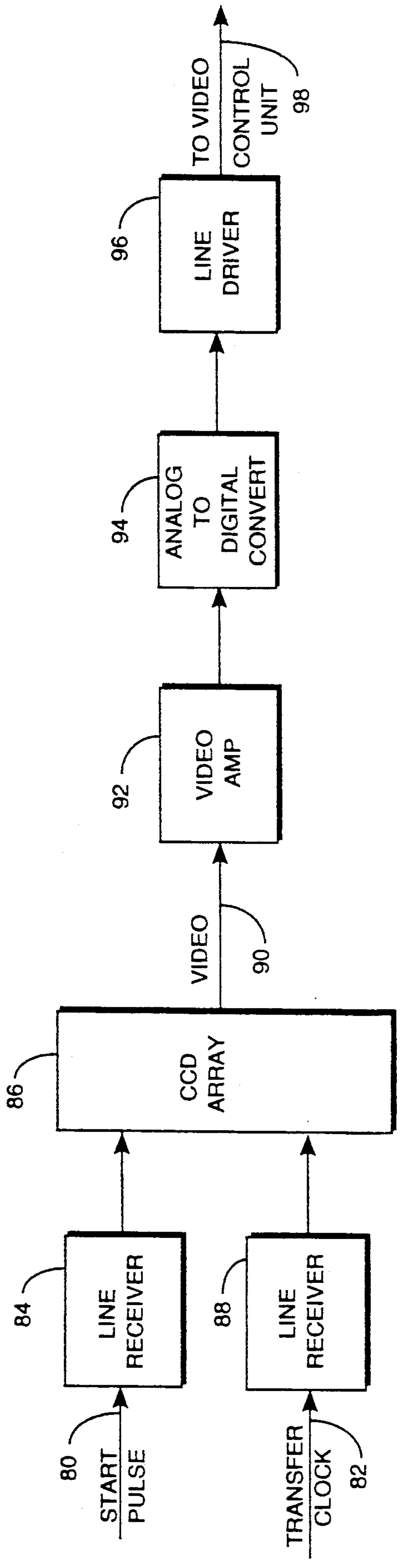
FIG. 3 is a block diagram of a video camera portion of the present invention.

Referring now to FIG. 3, a block diagram of a video camera usable with the present invention is illustrated. A periodic start pulse is received on line 80 from video control unit 60 shown in FIG. 2. Likewise, a periodic transfer clock is received on a line 82 from video control unit 60. The start pulse is conditioned by line receiver 84 to be usable by linear CCD array 86. Likewise, line receiver 88 conditions the transfer clock signal for use by the CCD array 86. CCD array 86 may be any commonly available CCD integrated circuit device such as Fairchild CCD 139. The start pulse on line 80 is used to cause the CCD array to begin sensing reflected light, and the transfer clock on line 82 is used to synchronize the output of captured video information on line 90. Serial video information on line 90 is amplified by video amp 92 and is converted to a digital signal level by analog to digital converter 94. The output of analog to digital converter 94 is conditioned by line driver 96 for transmission via line 98 to video control unit 60.

Figure 4:
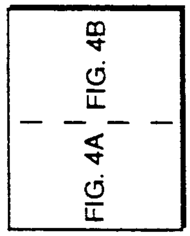
FIG. 4 including
Figure 4A:
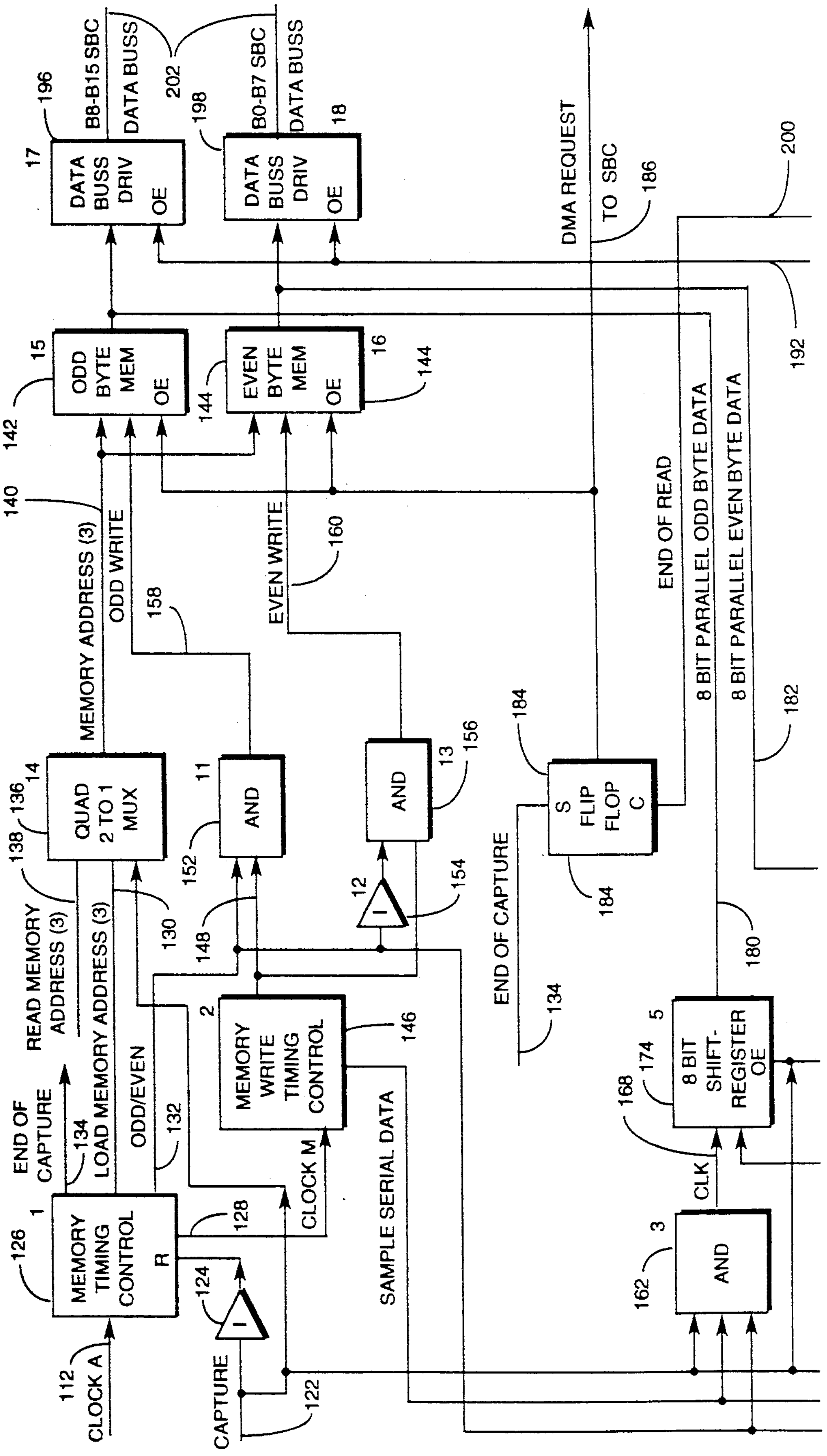
FIGS. 4A and 4B, is a block diagram of a video control unit portion of the present invention.
Figure 4B:
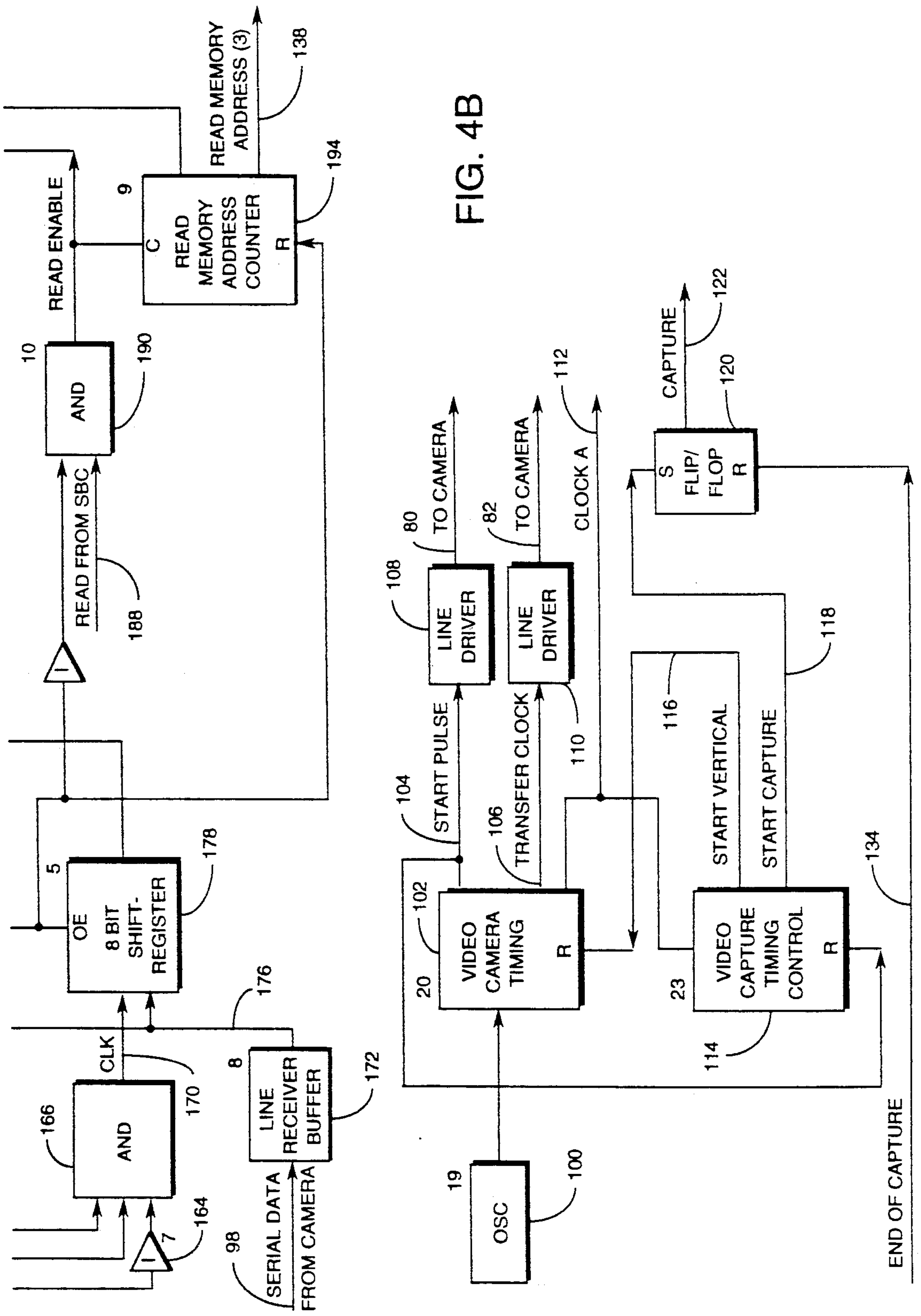

Each video control unit 60 functions to reformat the serial video from its associated video camera into a form which is usable by a digital computer. Referring now to FIGS. 4A and 4B, a block diagram of video control unit 60 is illustrated. Oscillator 100 provides the basis for all timing events. The oscillator frequency is variable to allow for sequence indicator fonts having variable sizes. Oscillator 100 drives video camera timing counter 102. Counter 102 generates a start pulse on line 104 and a transfer clock on line 106. The start pulse on line 104 is provided via line driver 108 to line 80 and ultimately to CCD array 86 as shown in FIG. 3. Likewise, the transfer clock on line 106 is provided via line driver 110 to line 82 and ultimately to CCD array 86 as shown in FIG. 3. The video camera timing counter 102 also generates a CLOCKA signal on line 112. The CLOCKA signal on line 112 is also provided to the clock input of video capture timing counter 114. The start pulse on line 104 is provided to the reset input of video capture timing counter 114. The video capture timing counter 114 generates a "START VERTICAL" signal on line 116 which serves to reset video camera timing counter 102. Additionally, video captured timing counter 114 generates a "START CAPTURE" signal on a line 118 that serves to set an SR flip flop 120 which, in turn, generates a "CAPTURE" signal on a line 122.

The video cameras usable with the present invention are preferably very small. As a result, the lenses used create significant optical distortion around the periphery of the viewing range. Consequently, it has been found desirable to use only the center portion of the lens for sensing sequence indicators. To accomplish this, a linear CCD array having 544 cells, for example, may be used with only the center 128 cells actually used to capture video information. By allowing only the center portion of the CCD array to capture meaningful video information, only the center, undistorted lens region is used, dramatically improving the sensing quality.

Thus, in operation, the start pulse on line 104 causes the CCD array 86 to sense a slice of video information. The transfer clock on line 106 is used to sequentially read from the CCD array 86 the information sensed by the 544 cells of the array. The CLOCKA signal on line 112 has the same frequency as the transfer clock on line 106 and causes the video capture timing counter 114 to count the CCD cells being transferred. When the beginning of the 128-cell portion of desired video information begins, video capture timing counter 114 generates a "START CAPTURE" signal on line 118. This causes the S/R flip flop 120 to become set, thereby generating a "CAPTURE" signal on line 122. As described hereinafter, the "CAPTURE" signal on line 122 is used to begin processing and storing the video information received from the video camera. In the meantime, the video capture timing counter 114 continues to count the transferred cell-by-cell information from the CCD array, and when the end of the array is reached, with 544 CCD cells having been transferred, the video capture timing counter 114 generates a START VERTICAL signal on line 116 which resets the video camera timing counter 102. Upon being reset, the video camera timing counter 102 generates a new start pulse on line 104 which resets the video capture timing counter 114, and the next slice of video information is ready to be retrieved.

During the transfer cycle of any given video information slice, when the central 128-cell portion is reached, the CAPTURE signal on line 122 is generated. Inverter 124 inverts the CAPTURE signal, and the inverted CAPTURE signal is applied to the reset terminal of memory timing control 126. Additionally, the CLOCKA signal on life 112 which is synchronous with the transfer clock signal on line 106, is provided to the clock input of memory timing control 126. Memory timing control 126 provides on line 128 a CLOCKM signal which is synchronous with the CLOCKA signal on line 112. Also, the memory timing control 126 generates a three-bit count on line 130 that increments on every 16 CLOCKA pulses. Memory timing control 126 further generates an "ODD/EVEN" signal on line 132 that toggles with every eighth CLOCKA pulse. Finally, memory timing control 126 generates an "END OF CAPTURE" signal on line 134 when the three-bit count signal on line 130 overflows. Thus, on the 128th CLOCKA pulse after the memory timing control 126 comes out of reset, an END OF CAPTURE signal is generated on line 134. A two-to-one multiplexer 136 receives the three-bit count on line 130, referred to as a "LOAD MEMORY ADDRESS," and another three-bit count on line 138, referred to as a "READ MEMORY ADDRESS." The CAPTURE signal from line 122 is provided to the select input of multiplexer 136 so that the state of the CAPTURE signal will determine whether the LOAD MEMORY ADDRESS three-bit signal on line 130 or the READ MEMORY ADDRESS three-bit signal on line 138 is coupled to the output of multiplexer 136 on line 140. The resulting three bit memory address on line 140 is applied to both memory device 142 and memory device 144. Both memory devices 142 and 144 are 8-bit by 8-byte static memory integrated circuits. Memory write timing counter 146 receives the CLOCKM signal on line 128 and generates a syhchronous output on line 148 toggling with every eighth CLOCKM cycle, and another synchronous output on line 150, toggling with every CLOCKM cycle. The signal on line 148, together with the ODD/EVEN signal on line 132 is provided to AND gate 152. Likewise, the signal on line 148, together with the ODD/EVEN signal on line 132, having been inverted by inverter 154, is applied to AND gate 156. The output of AND gate 152 is an "ODD WRITE" signal and is applied via line 158 to the write enable input of memory device 142. In a similar manner, the output of AND gate 156 is an "EVEN WRITE" signal and is applied via line 160 to the write enable input of memory device 144.

The ODD/EVEN signal on line 132 is applied to AND gate 162 together with the CAPTURE signal on line 122 and the signal on line 150. The ODD/EVEN signal on line 32, having been inverted by inverter 164, is applied to AND gate 166 together with the CAPTURE signal on line 122 and the signal on line 150. The output of AND gate 162 on line 168 is an odd capture clock signal, and the output of AND gate 166 on line 170 is an even capture clock signal. Serial video information from the CCD array is received via line 98, and line receiver buffer 172. An 8-bit shift register 174 receives the serial video information on line 176 and shifts that information with each pulse of the odd capture signal on line 168. Similarly, an 8-bit shift register 178 receives the serial video information on line 176 and shifts that information with each pulse of the odd capture clock signal on line 170.

Shift registers 174 and 178 alternately each receive eight bits of incoming serial video information. Once eight bits have been received by each shift register 174, 178, the eight bits of odd information from shift register 174 are loaded into memory device 142 via line 180 with the assertion of the ODD WRITE signal on line 158. Likewise, the eight bits of even serial information from shift register 178 are loaded via line 182 into memory device 144 with the assertion of the EVEN WRITE signal on line 160.

In operation, while capturing video information, memory timing control 126 comes out of reset and issues a LOAD MEMORY ADDRESS of logic "0" on line 130. Multiplexer 136 is caused, by capture signal 122, to couple LOAD MEMORY ADDRESS of logic "0" on line 130 to the memory address line 140. At this point, the memory devices 142 and 144 are being addressed with the address of logic "0". Also, at this point, the ODD/EVEN signal on line 132 is a zero enabling the output of AND gate 166 to depend upon the input on line 150. Likewise, at this point, the output of AND gate 156 is enabled to follow the input on line 148. With the first bit of serial video information received by line receiver buffer 172, the first CLOCKA signal on line 112 is generated. This toggles the CLOCKM signal on line 128, thereby causing the signal on line 150 to toggle as well. As a result, the odd capture clock signal on line 170 toggles, shifting the first received bit of serial video information into shift register 178. The next seven bits of serial video information are clocked into shift register 178, syhchronously with CLOCKA, in a similar manner. After the eighth clock pulse, memory write timing counter 146 issues a signal on line 148 causing the output of AND gate 156 to become asserted, thereby writing the contents of shift register 178 into memory device 144 at address location zero.

The ODD/EVEN signal on line 132 then toggles, disabling the output of AND gate 166 AND gate 156 and enabling the output of AND gates 162 and 152. In a similar manner, the next eight bits of incoming serial video information are shifted into shift register 174 with each CLOCKA pulse. Next, the contents of shift register 174 are written into memory device 142 at address location zero, as a result of memory write timing counter 146 issuing another signal on line 148 which is coupled through AND gate 152 to line 158.

After the sixteenth CLOCKA pulse, memory timing control 126 increments the LOAD MEMORY ADDRESS on line 130 and toggles the ODD/EVEN signal on line 132 once again. At this point, the memory address signal on line 140 is a logic "1", causing address location one of memory devices 142 and 144 to be addressed. The next sixteen bits of serial video information are clocked into shift registers 174 and 178 as described above, and then their contents are respectively written into memory devices 142 and 144 as described above, but at location one.

With every sixteen CLOCKA pulses, memory timing control 126 increments the LOAD MEMORY ADDRESS signal on line 130 until 128 bits of serial video information have been loaded into memory devices 142 and 144. At this point, after the 128th CLOCKA pulse, memory timing control device 126 issues an "END OF CAPTURE" signal on line 134. The END OF CAPTURE signal on line 134 resets S/R flip flop 120, thereby removing the CAPTURE signal on line 122. The END OF CAPTURE signal on line 134 also sets SR flip flop 184, causing line 186 to become active. Line 186 is coupled to the output enable terminals of memory devices 142 and 144, and also to a direct memory access (DMA) request input of slave processing unit 62.

At this point, the slice of video information, comprising 544 individual bits from the CCD cells, continues to be transferred to video control unit 60, but only 128 of the video bits have been captured and stored in memory devices 142 and 144. The remainder are ignored.

A DMA request asserted on line 186 to the slave processing unit 62 causes the slave processing unit 62 to issue "READ" pulses on line 188. The READ pulses on line 188 are input to AND gate 190 which, at this time, is enabled by an inactive CAPTURE signal on line 122. The READ pulses are thus output from AND gate 190 on line 192 and are provided to the clock input of read memory address counter 194 and are also provided to the output enable terminals of data bus drivers 196 and 198. Read memory address counter 194 generates a three-bit READ MEMORY ADDRESS on line 138 that is incremented with each READ pulse provided via line 192. After the eighth read pulse, the three-bit READ MEMORY ADDRESS signal on line 138 overflows, and read memory address counter 194 issues an "END OF READ" signal on line 200. The END OF READ signal on line 200 is provided to the reset input of S/R flip flop 184 causing line 186 to become inactive The three-bit READ MEMORY ADDRESS on line 138 is input to multiplexer 136, and, when the CAPTURE signal on line 122 is inactive, the signal on line 138 is coupled by multiplexer 136 to memory address line 140.

In operation, each READ pulse on line 192 causes an incrementally higher byte of memory device 142 and memory device 144 to be provided to data bus drivers 196 and 198 and ultimately to data bus 202 which is provided to the slave processing unit 62.

In the preferred embodiment, the slave processing unit 62 is a single board microcomputer based upon an Intel 80186 microprocessor integrated circuit, but can be any digital computer. Likewise, the master processing unit 64 of the preferred embodiment is a single board micro-computer based upon an Intel 80186 microprocessor integrated circuit, but also can be any digital computer. The function and the operation of the master processing unit 64 and the respective slave processing units 62 will be described hereinafter. Generally, the slave processing units 62 will be programmed to receive and interpret the digital information provided by video control units 60, thereby providing an indication of the sensed sequence number. The master processing unit 64 is programmed to receive the sensed sequence indicators from the respective slave processing units 62 and determine from them whether each mass mail item is being collated and assembled so that personalized pieces for a given recipient are assembled together.

The basic hardware of each slave processing unit 62 is the same and is also the same as that of the master processing unit 64. Each slave processing unit 62 and the master processing unit 64 has a number of dip switches which are used to establish whether the processing unit is a master or a slave, and if a slave, which slave. The dip switches are also used to establish certain input/output port configuration parameters. Furthermore, the software structure of each slave processing unit is the same and is also the same as that of the master processing unit 64. As described hereinafter, the processing units under software control examine the status of the dip switches upon initialization of the system to establish their respective assigned functions.

Figure 5A:
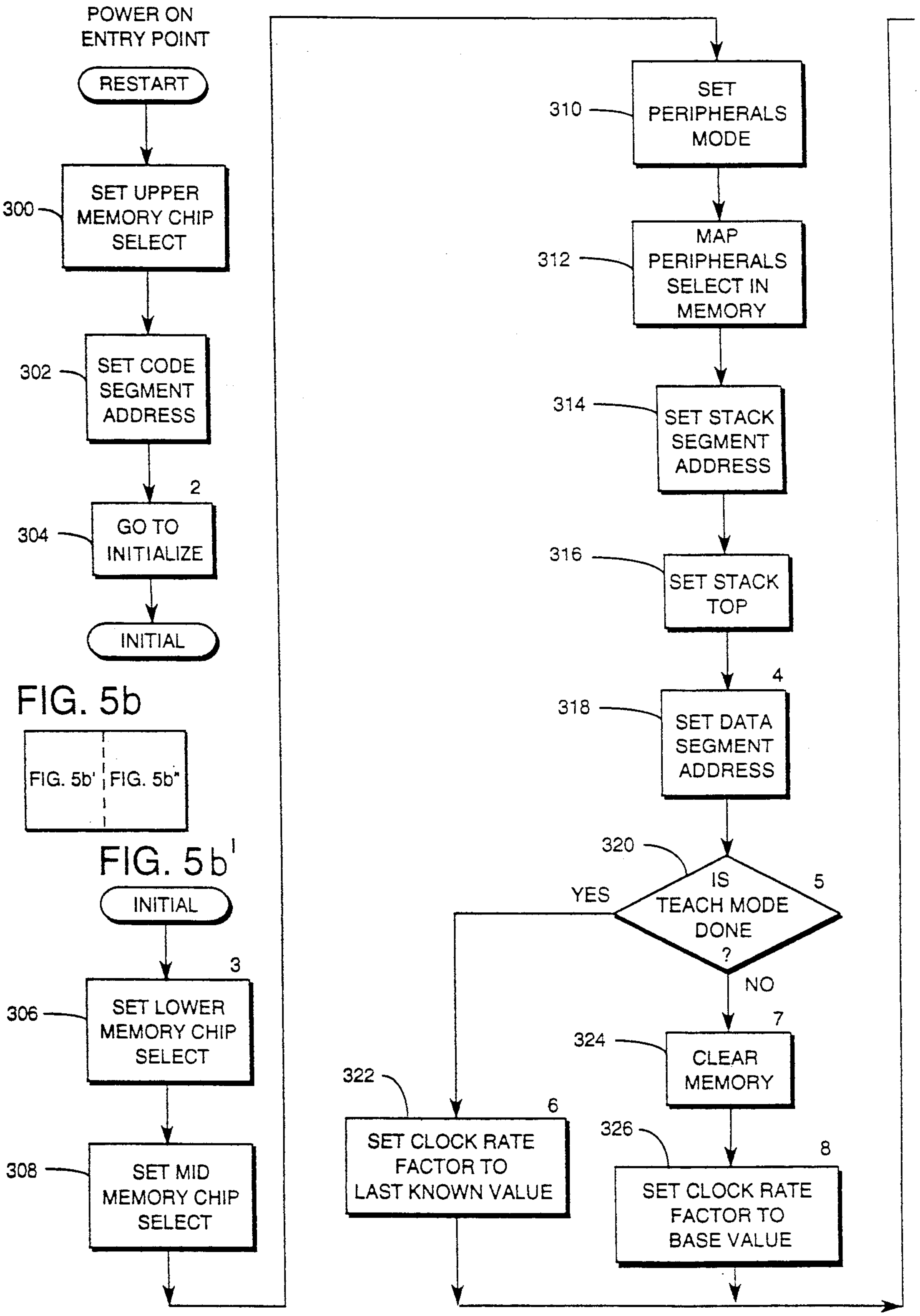

FIGS. 5*a*, 5*b*' and 5*b*" are flow charts illustrating the sequence of software operations performed by each processing unit upon initialization. Upon power up, the first function performed, at block 300 of FIG. 5*a*, is the setting of upper memory chip select. Next, at block 302, the code segment address is set. At block 304, execution jumps to the INITIAL routine.

FIGS. 5*b*' and 5*b*" is a flow chart illustrating the functions performed by the INITIAL routine. At block 306, the lower memory chip select is set. Next, at block 308 the mid-memory chip select is set. At block 310, the peripherals mode, or input/output structure, is set based upon the position of certain dip switches. At block 312 the selected peripherals are mapped in memory. At block 314 the stack segment address is set. At block 316, the address of the top of the stack is set. At block 318, the data segment address is set.

At decision block 320, a certain memory location is tested for a value that indicates that the system has previously been set up to perform matching operations. If the system has previously been set up, i.e., if the teach mode is done, as described below, then at block 322, a real time clock is set to operate at the frequency previously used. In the preferred embodiment, the real time clock is a software adjustable clock, internal to the Intel 80186 microprocessor integrated circuit used as the basis for each processing unit. The function of the real time clock is described hereinafter. If, from block 320, it is determined that the system has not been previously set up to perform matching operations, i.e., if the teach mode is not done, then at block 324, all variable memory is cleared, and at block 326, the real time clock is set to a base rate.

The next four blocks establish certain values which, depending upon the function (master or slave) will be used to control the common system interface. Additionally, the value needed to determine whether a given processing unit is assigned to be a master or a slave is obtained This is accomplished at block 328 where a logic "0" from the dip switch will define a master processor. All other values from the dip switch will define a specific slave processing unit. For example, a binary value "1" from the dip switch will define slave processing unit number 1, a binary value "2" from the dip switch will establish slave processing unit number 2, etc. At decision block 330, the dip switch is tested, and if it is determined that the processing unit will be the master, then a set of functions are performed which establishes the interface with a CRT/keyboard terminal. Because the master processing unit is the only processing unit which directly communicates with the operator, only the master performs these steps, which are accomplished at blocks 332, 334 and 336. At block 332, the serial port base clock rate is set. At block 334, the baud rate clock is set to 9600. At block 336, the RS232 port is initialized. Additionally, at block 338 the input/output port is configured for a master processing unit.

If, from decision block 330, it is determined that a given processing unit is a slave, then, at block 344, the input/output port is configured for a slave processing unit. The input/output port configuration which is performed at blocks 348 and 340 is to allow communication between the master and the respective slave processing units.

Next, regardless of whether a given processing unit is a master or a slave, the real time clock rate is set at block 342. In all processing units, the real time clock series to generate a highest priority interrupt. The real time clock, in the preferred embodiment, is set to equate to 1/10th of an inch of transport motion, sensed by motion sensor 66 as shown in FIG. 2. At decision block 344, a test is again made to determine whether the processing unit in question is a master or a slave. If, from block 344, it is determined that the processing unit in question is a master, then, at block 346, program control is transferred to a master executive routine described hereinafter. If, however, from decision block 344, it is determined that the processing unit in question is a slave processor, then, at block 348 program control is transferred to a slave executive routine described hereinafter.

Figure 6B:
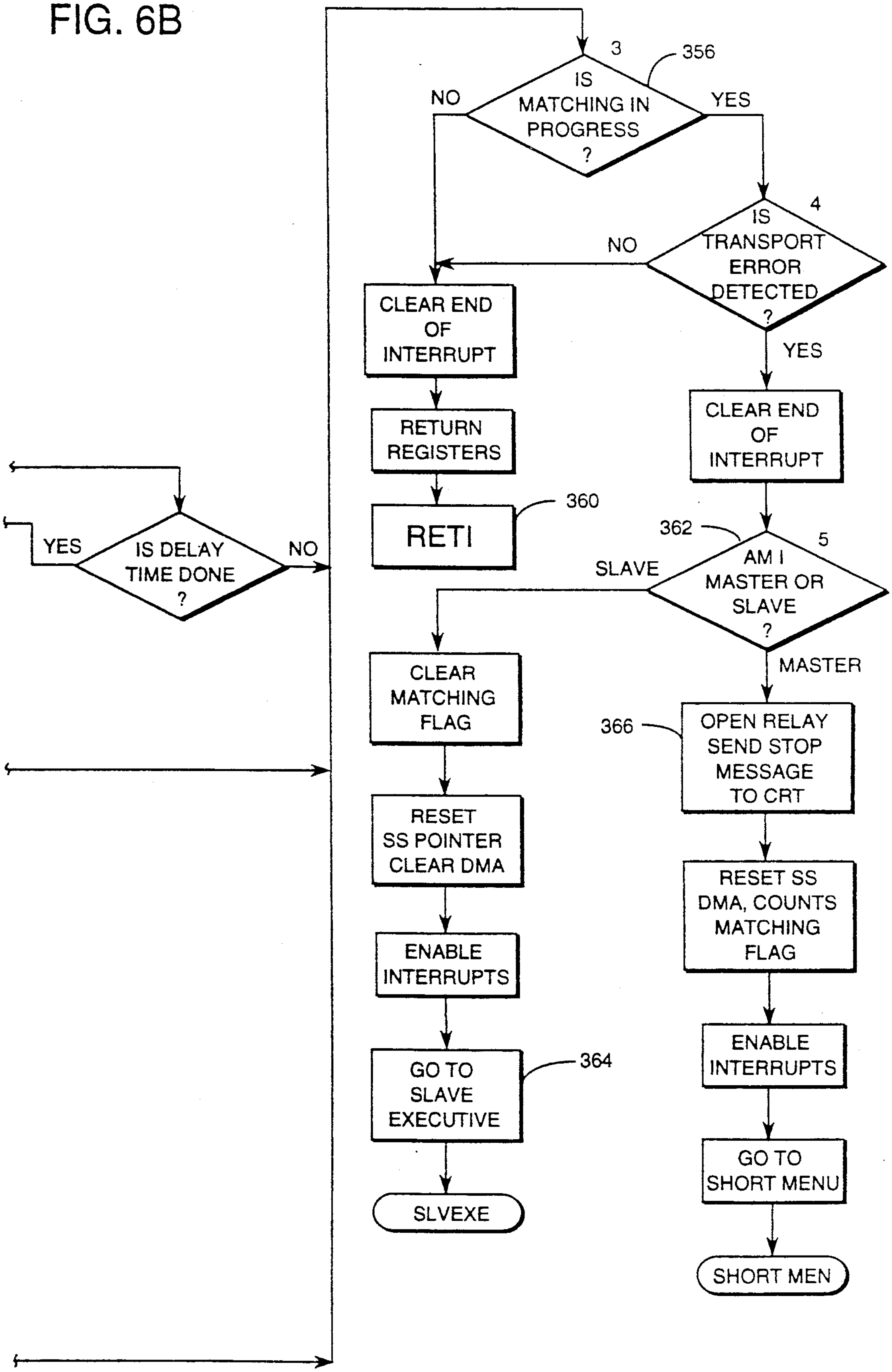

As described above, at each real time clock pulse, which, if properly adjusted, equates to 1/10th of an inch of transport motion, an interrupt is generated. FIGS. 6A and 6B illustrate a flow chart of the service routine for the interrupt which is generated. Decision block 350 begins a routine that monitors the motion of the transport of the system. Each transport cycle includes a period during which the transport is moving and a period during which the transport is stopped. The routine beginning at decision block 350 continually monitors the length of the period during which the transport is running and the length of the period during which the transport is stopped. If either the running period or the stopped period exceeds a maximum value based upon the real time clock, an error flag is set at block 352 or 354.

At decision block 356, a determination is made as to whether the system is currently operating to assemble personalized mass mail items. If the system is so operating, a determination is made at decision block 358 as to whether a transport error is detected based upon the error flag described above. If, from decision block 356, it is determined that mass mail assembly is not taking place, or, from decision block 358, it is determined that no error has been detected, then the interrupt service routine is concluded, and control is returned, at block 360, to the program which was interrupted If, from decision block 358, it is determined that a transport error has been detected, a determination is made at decision block 362 as to whether the processor in question is a master or a slave. If, from decision block 362, it is determined that the processing unit in question is a slave, then control is returned, at block 364, to the slave executive routine described hereinafter. If, however, from decision block 362, it is determined that the processing unit in question is a master, then at block 366, the run stop relay 68, as shown in FIG. 2, is opened, causing the transport to stop, and a stop message is displayed to the operator at the CRT/keyboard terminal.

Figure 7:
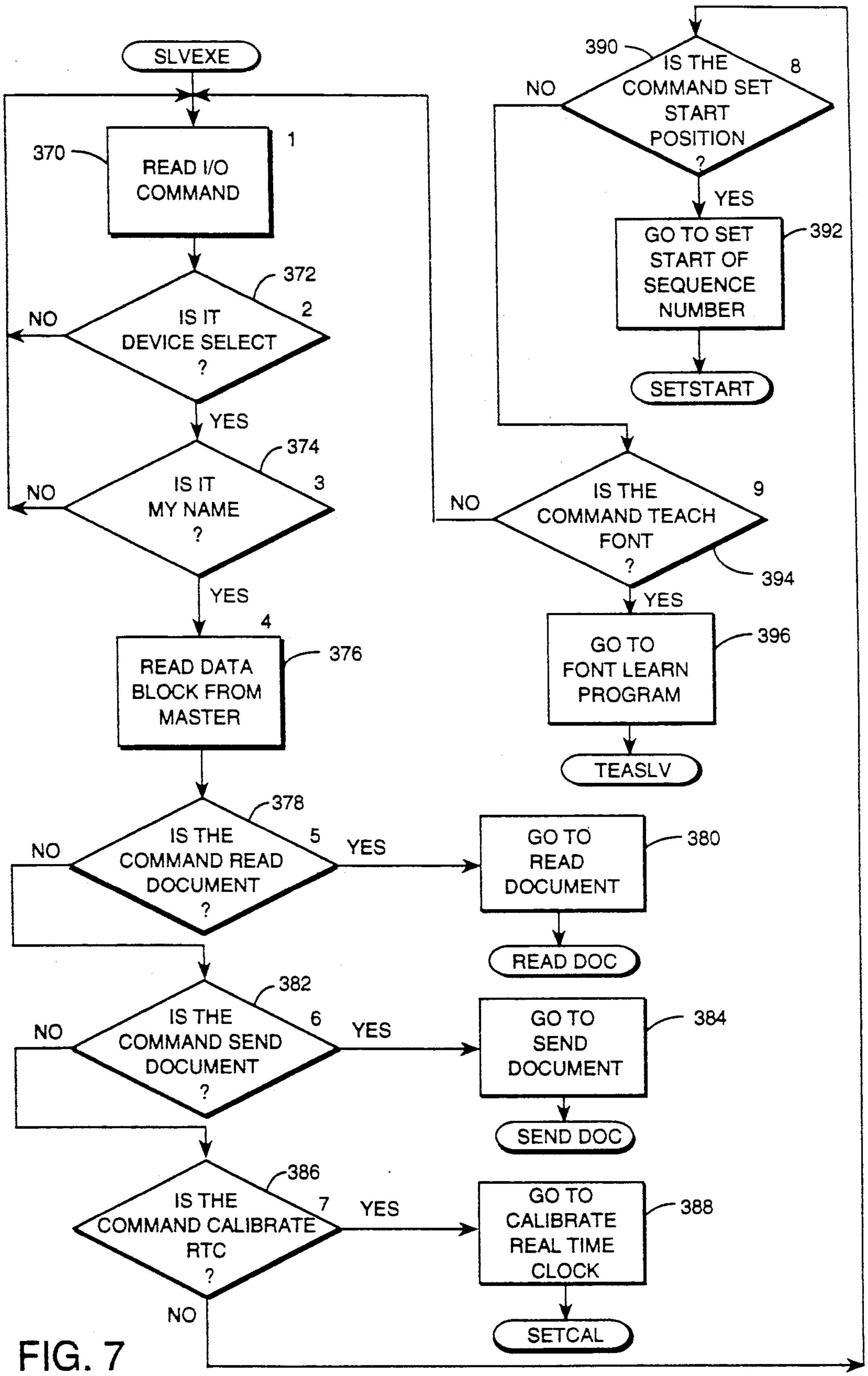
FIG. 7 is a flow diagram illustrating operations performed by the slave executive aspect of the present invention.

FIG. 7 is a flow chart illustrating the operation of the slave executive routine. In general, the slave executive waits for a command from the master processing unit and then executes that command. In the preferred embodiment, there are five commands that the slave executive performs. The first command is to learn a font. The second command is to sense a sequence indicator. The third command is to send the sensed sequence indicator to the master. The fourth command is to set the sequence indicator start position, as described hereinafter. The fifth command is to calibrate the real time clock.

At block 370, the slave processing unit examines the interface control signals, waiting for the master to select a particular slave processing unit. When an interface control signal is detected at decision block 372, a determination is made at decision block 374 as to whether the slave processing unit in question is the slave processing unit being addressed by the master. If so, at block 376, the command is read from the master. If the command is to sense a sequence indicator, as determined from decision block 378, program control is transferred at block 380 to a "read document" routine. If, from decision block 378, it is determined that the command is not to sense a sequence indicator, then at decision block 382, a determination is made as to whether the command is to send a sensed sequence indicator to the master. If so, program control is transferred at block 384 to a "send document" routine. If, from decision block 382, it is determined that the command is not to send a sensed sequence indicator to the master, then, at decision block 386, a determination is made as to whether the command is to calibrate the real time clock. If so, program control is transferred at block 388 to a "calibrate real time clock" routine. If, from decision block 386 it is determined that the command is not to calibrate the real time clock, then a determination is made at decision block 390 as to whether the command is to set the start position of the sequence indicator. If so, program control is transferred at block 392 to a "set start of sequence number" routine. If, from decision block 390, it is determined that the command is not to set the start position, then, at decision block 394, a determination is made as to whether the command is to learn a font. If so, then program control is transferred at decision block 396 to a "font learn" routine. If, from decision block 394, it is determined that the command is not to learn a font, then control returns to block 370 at the beginning of the slave executive routine.

Figures 8, 8A:
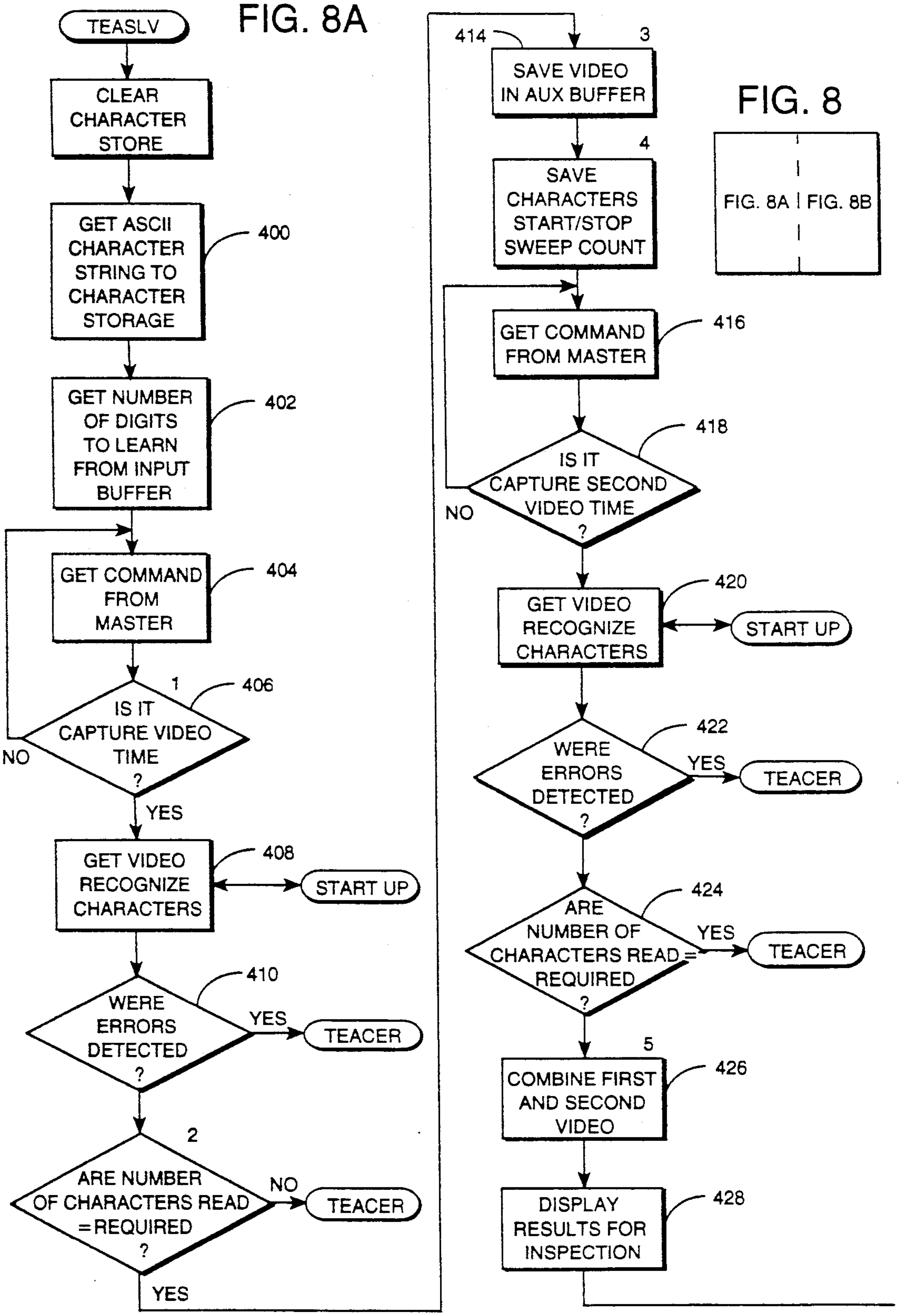
FIG. 8, including
FIGS. 8A and 8B, is a flow diagram illustrating operations performed by a font learn aspect of the present invention.
Figure 8B:
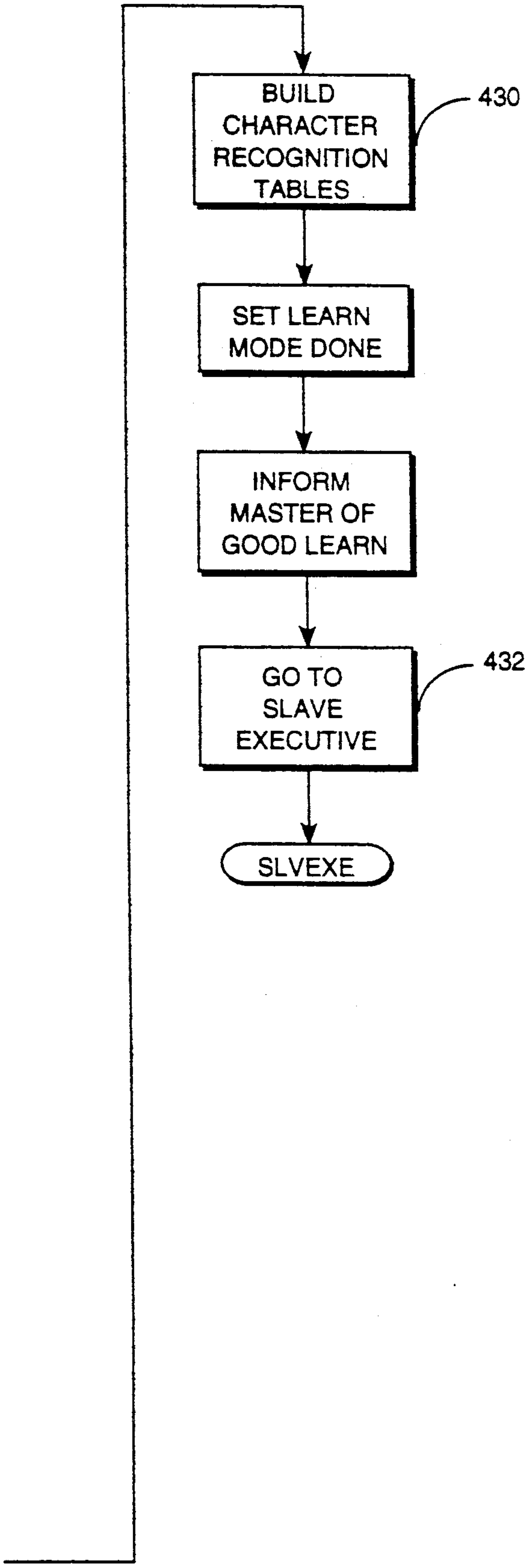
Figure 9:
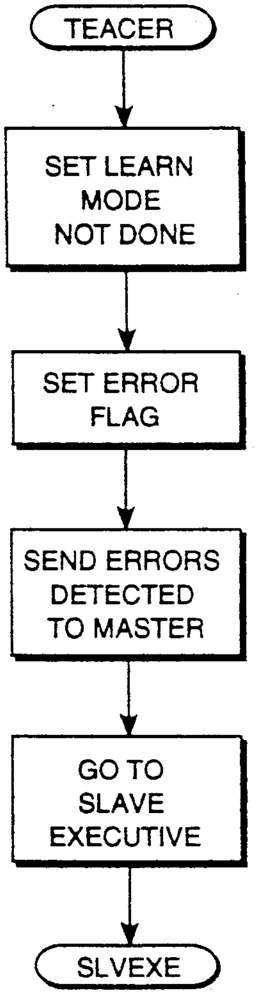
FIG. 9 is a flow diagram illustrating operations performed by a teach error aspect of the present invention.

A slave processing unit is taught a font by providing to the video camera associated with the slave processing unit in question a sequence of characters (e.g., 0 1 2 3 4 5 6 7 8 9) in the font to be learned. Additionally, the operator provides to the slave processing unit in question, via the CRT/keyboard terminal and the master processing unit, the sequence of characters which are to be learned. FIGS. 8A and 8B illustrate a flow chart of the font learn routine executed by a slave processing unit in order to learn a particular font. At block 400, the slave processing unit receives from the learned. At block 402 the slave processing unit receives from the master the number of individual digits to learn. At block 404, and decision block 406, the slave processing unit then waits for a command from the master processing unit to begin capturing video. If, from decision block 406, it is determined that the master has commanded the slave processing unit in question to capture video information of the character string being provided to it, than at block 408, a subroutine called START_UP is called. The START UP subroutine, as described below, performs low level analysis of the video information. At decision block 410, a determination is made as to whether any errors were detected during the capture of video information. If so, control is transferred to a TEACER routine shown in flow diagram form in FIG. 9.

Figure 10:
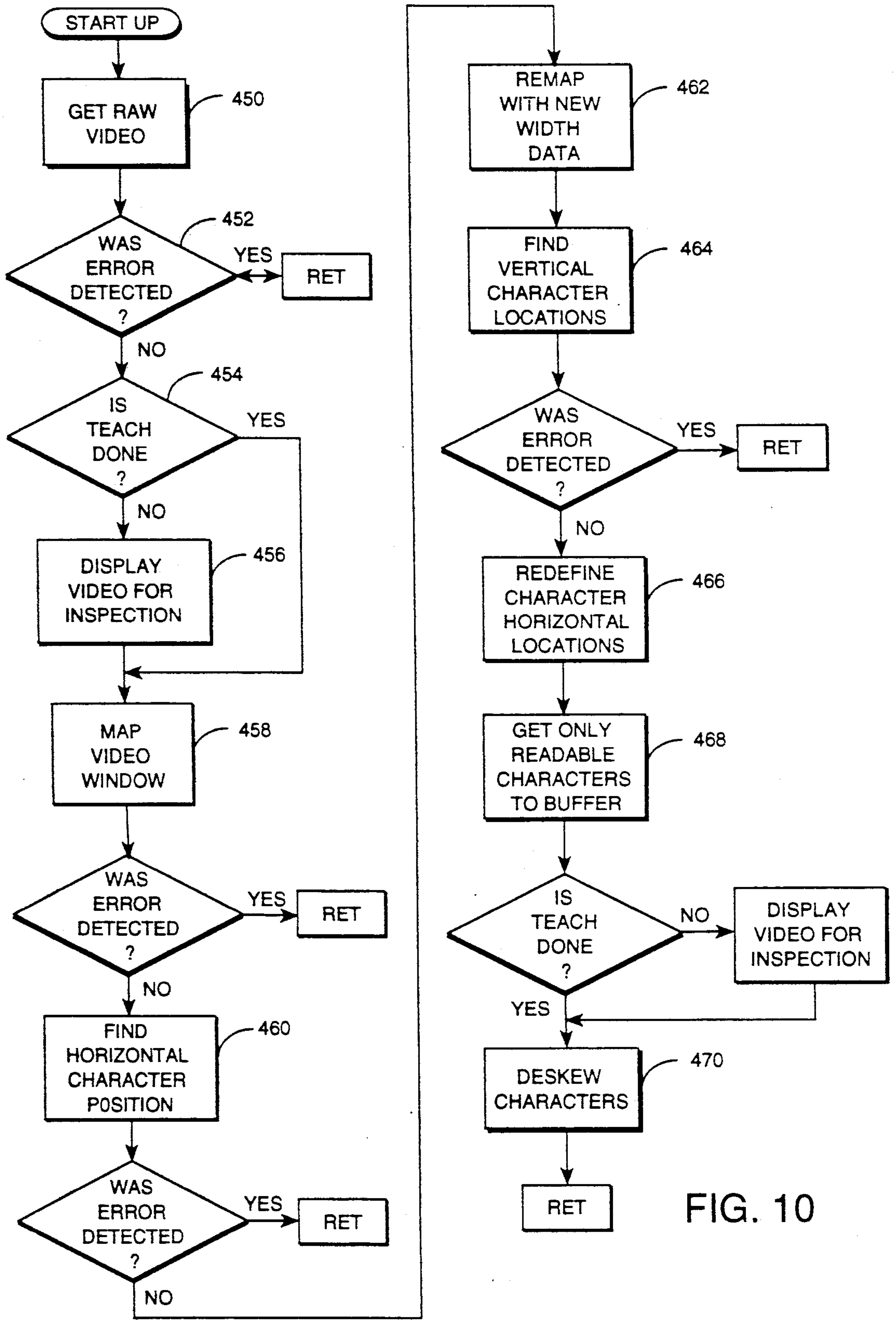
FIG. 10 is a flow diagram illustrating operations performed by a START_UP aspect of the present invention.

If, from decision block 410, it is determined that no errors were detected, then a determination is made at decision block 412 as to whether the number of characters actually sensed is equal to the number of characters or digits which were to be sensed from block 402. If not equal, then control passes to the error routine TEACER. If equal, however, then, at block 414, the captured characters are saved in a buffer. Then, at blocks 416 and 418, the slave processing unit waits for another capture command from the master processing unit. Once a second capture command is received by the slave processing unit, then the steps performed earlier at blocks 408, 410 and 412 are again performed at blocks 420, 422, and 424 respectively. Then, at block 426, both of the first and second captured video images are combined to form a master video image of the characters being learned. At block 428, the master video image is displayed on the CRT to the operator for a visual determination of the quality of the learned video. At block 430, the master video image is stored in tables in memory for future matching purposes. Finally, at block 432, control is returned to the slave executive routine FIG. 10 is a flow chart illustrating the function of the START_UP subroutine which was called from the font learn routine of FIGS. 8A and 8B. At block 450, raw video information is obtained from the video control unit 60 retrieve 512 consecutive slices of video information generated by the video control unit 60. The 512-slice window of video information begins at the location on the mail piece being sensed which is determined by the SETSTART routine described hereinafter. Essentially, the SETSTART routine allows the operator to set the beginning of the video window measured from the leading edge of the mail piece in 1/10th inch increments. At decision block 452, a check for errors is made, and if none, a determination is made at decision block 454, as to whether the slave processor has already learned a font. If not, the captured video is displayed for inspection at block 456. Next, or, from block 454, if the font has already been learned, the captured video window is mapped at block 458 into memory tables for analysis.

At block 460, the tables are analyzed to determine the first vertical sweep in which sequence indicator video information is present. At block 462, the tables are remapped based upon the leading edge of the sequence indicator determined at block 460. At block 464, the tables are analyzed to determine the vertical location of the sequence indicator within the window. Block 464 therefore establishes the vertical height of the characters and the byte in the vertical data table where the sequence indicator begins. At block 466, the tables are examined to determine the leading and trailing edges of each individual character of the sensed sequence indicator. At this point, the slave processing unit has determined the character height, the character width and the length of the sensed sequence indicator, as well as the precise location of the sensed sequence indicator within the entire captured video field. At block 468, the individual characters of the sensed sequence indicator are buffered separately. Finally, block 470 serves to de-skew each character. This is accomplished by aligning each character to a common base. The de-skewing function of block 470 is needed because the mechanism of a typical inserting device is not designed to have motion tolerances suitable for character recognition. Because mail items on the transport have a tendency to skew as they move, the captured video characters must be suitably de-skewed.

Figure 11:
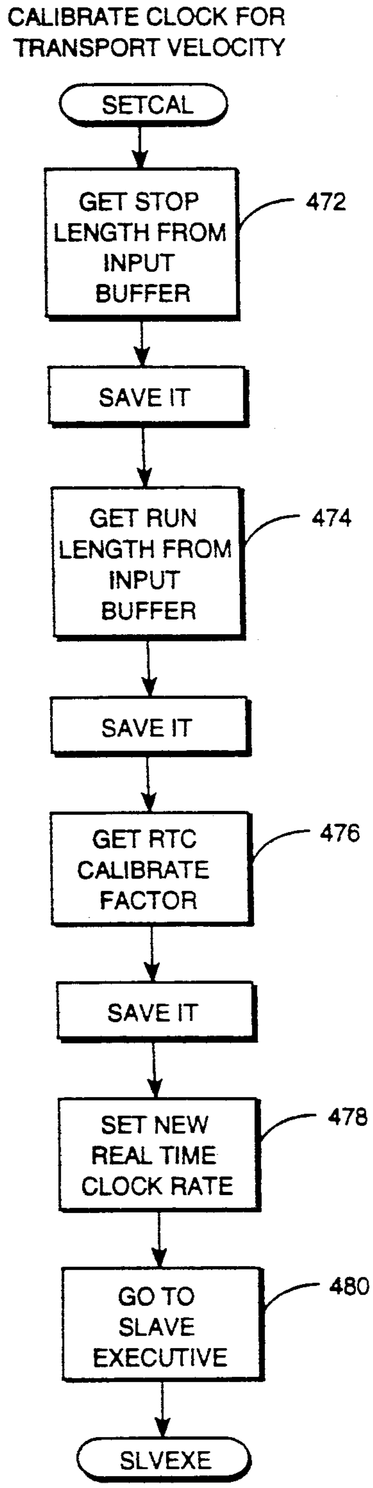
FIG. 11 is a flow diagram illustrating operations performed by a calibrate real time clock aspect of the present invention.

Returning briefly to FIG. 7, if a slave processing unit receives from the master a calibrate real time clock command, control will pass, at block 388, from the slave executive to a SETCAL routine. The SETCAL routine is illustrated in flow chart form in FIG. 11. The SETCAL routine sets the values needed to control the clock rates and to allow the slave processing unit to determine if a transport motion problem exists. At block 472, the slave processing unit receives from the master an indication of the length of the period of the transport cycle during which transport motion is stopped. At block 474, the slave processing unit receives from the master an indication of the length of the period of the transport cycle during which the transport is running. At block 476, the slave processing unit receives from the master a value, calculated by the master, used to set the real time clock to the correct value based upon the current transport speed. All this information is saved by the slave processing unit and is used on power up initialization if a mass mail job is to be run. At block 478, the real time clock is set to the appropriate frequency. And finally, at block 480, control is returned to the slave executive routine.

Figure 12:
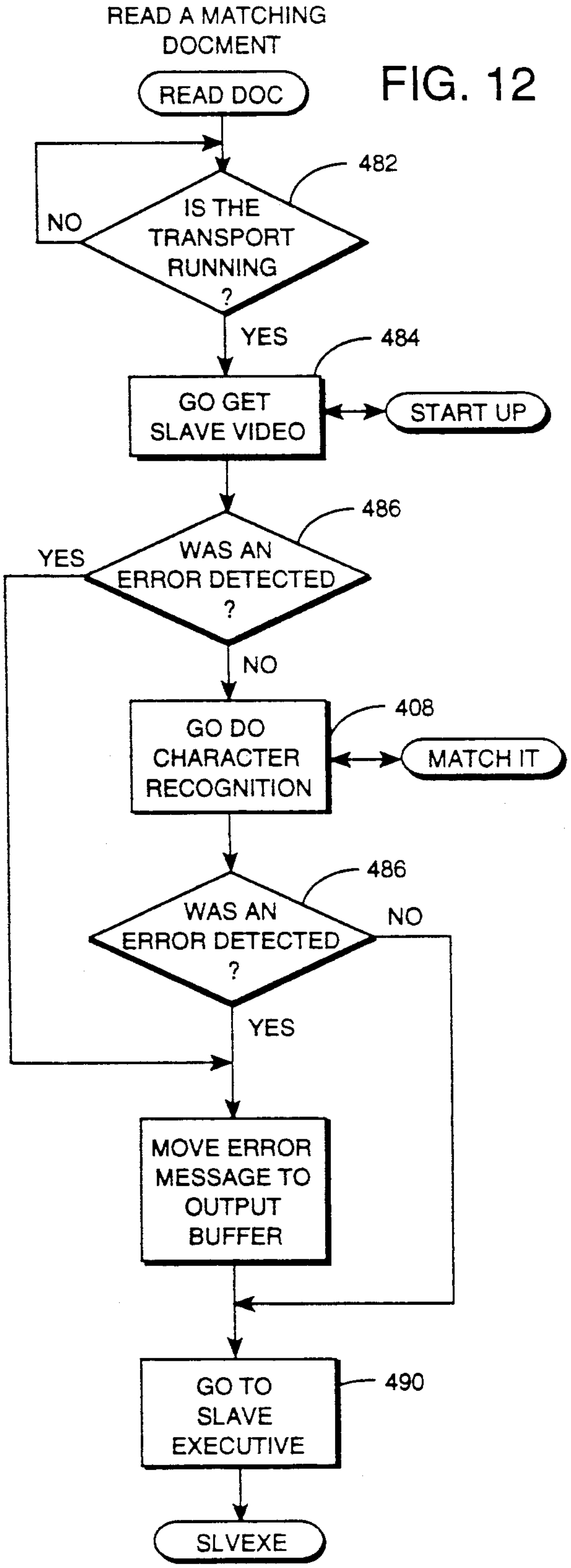
FIG. 12 is a flow diagram illustrating operations performed by a sequence indicator sensing aspect of the present invention.

If the slave processing unit receives a command from the master to sense a sequence indicator, control is passed to a READ_DOC routine at block 380 in FIG. 7. The READ_DOC routine is illustrated in flow chart form in FIG. 12. At block 482, the slave processing unit waits until the transport is running. Next, at block 484, the START_UP subroutine is called in order to get a window of video in the proper location as described above. At block 486, a determination is made as to whether an error was detected, and if not, at block 488, character recognition is performed by calling the subroutine MATCH_IT, which is described hereinafter. If no error is detected, control is passed to the slave executive routine at block 490.

Figure 13A:
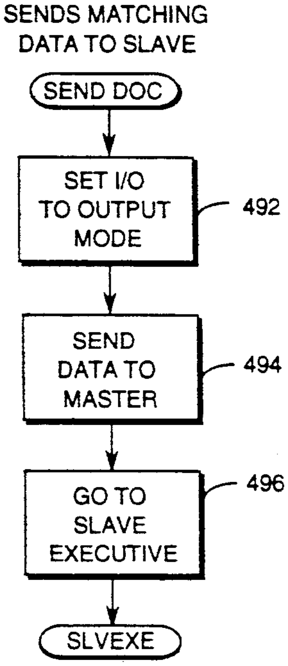
FIG. 13*a* is a flow diagram illustrating operations performed by a send document aspect of the present invention.

If a slave processing unit receives a command to send the sensed sequence indicator to the master, control will pass to a SEND_DOC routine at block 384 of FIG. 7. FIG. 13*a* illustrates the SEND_DOC routine in flow diagram form. At block 492, the slave processing unit's input/output mode is set to "output," and at block 494 the sensed sequence indicator is sent to the master processing unit. Finally, at block 496, control is returned to the slave executive routine.

Figure 13B:
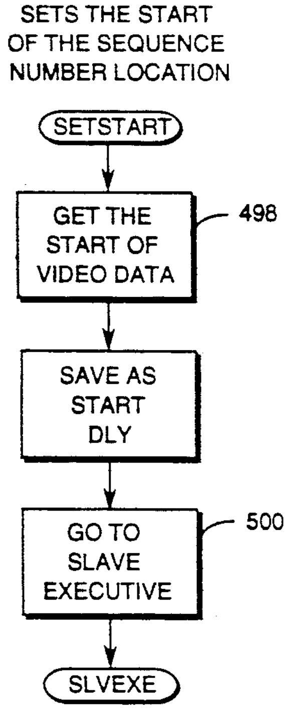
FIG. 13*b* is a flow diagram illustrating operations performed by a set the starting point of a sequence indicator aspect of the present invention.

If a slave processing unit receives from the master a command to set the start position of a sequence indicator to be sensed, control passes to a SETSTART routine from block 392 of FIG. 7. FIG. 13*b* is a flow chart illustrating the SETSTART routine. At block 498, the slave processing unit receives from the master the number of real time clock pulses to wait from the leading edge of a mail piece being sensed before capturing a window of video information. This information is provided to the master by the operator in tenths of inches and the master converts it into a number of real time clock periods based upon a calibration value of 1/10 of an inch of transport motion per real time clock. Finally, at block 500, control is returned to the slave executive routine.

Figure 14:
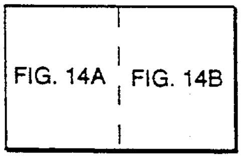
FIG. 14, including
Figure 14A:
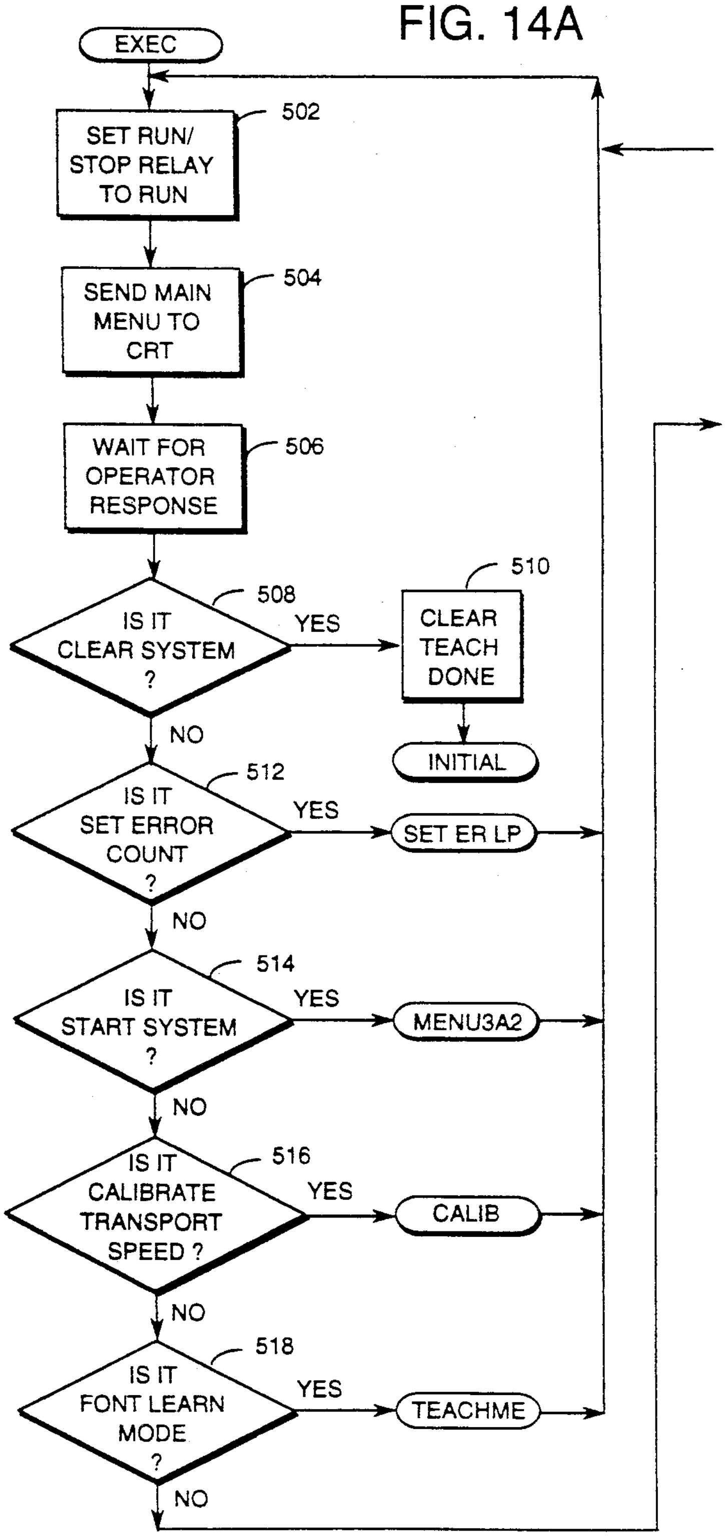
FIGS. 14A and 14B, is a flow diagram illustrating operations performed by a master executive aspect of the present invention.
Figure 14B:
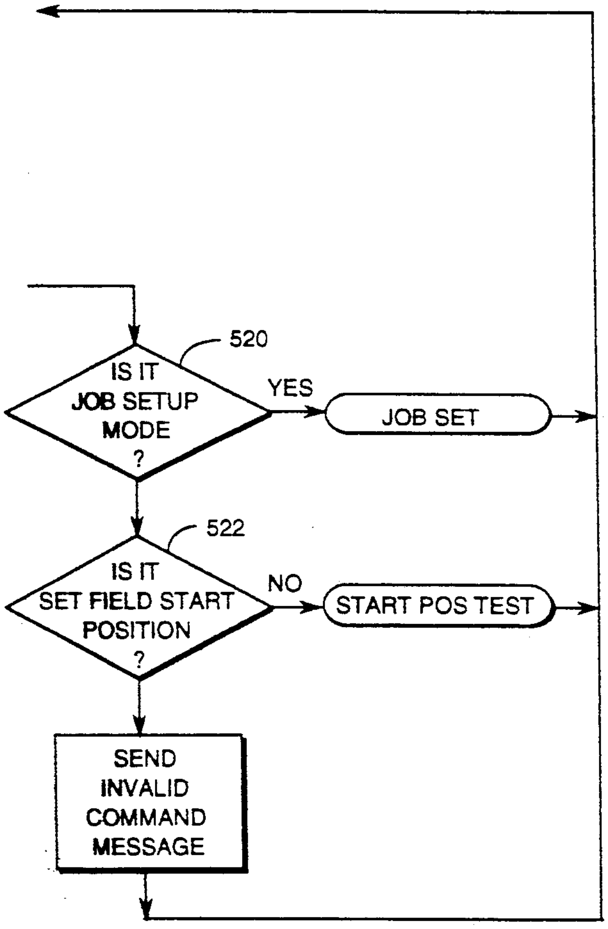

The master processing unit controls the activities of the slave processing units. Additionally, the master has all control over interface with the operator. When the master executive routine is entered from block 346 in FIG. 5*b*", a menu is presented to the operator at the CRT/keyboard. The menu guides the operator through system set up and initialization. FIGS. 14A and 14B illustrates in flow diagram form the master executive routine. At block 502, the run/stop relay, shown at 68 in FIG. 2, is set to allow the transport to run. The menu is displayed to the operator at block 504. At block 506, the master processing unit waits for a response from the operator. At decision block 508, a determination is made as to whether the response from the operator is to clear and initialize the system. If so, at block 510, a flag indicating that the system is ready to be run in production is cleared, and then the INITIAL routine shown in FIGS. 5*b*' and 5*b*" is entered. At decision block 512, a determination is made as to whether a response from the operator is to set the error count. This allows the operator to select the number of consecutive errors which will be allowed to occur before the transport mechanism is caused to stop. If, from decision block 512, it is determined that the response from the operator is to set the error count, then a routine labeled SET_ER_LP will be entered. Decision block 514 makes a determination as to whether the response from the operator is to start the matching system in mass mail assembly production. If so, a subroutine labelled MENU3A2, as described hereinafter, is called. Decision block 516 makes a determination as to whether the response from the operator is to set the real time clock so that one cycle of the clock equates to 1/10 of an inch of transport motion. If so, a subroutine labelled CALIB is called. Decision block 518 makes a determination as to whether the response from the operator is to learn a font. If so, a subroutine labelled TEACHME is called. At decision block 520 a determination is made as to whether the response from the operator is to perform a job set up. If so, a subroutine labelled JOB_SET is called. Decision block 522 makes a determination as to whether the response from the operator is to set the start position for a video capture on a mail piece. If so, a subroutine labelled START_POS_TEST is called.

Figure 15:
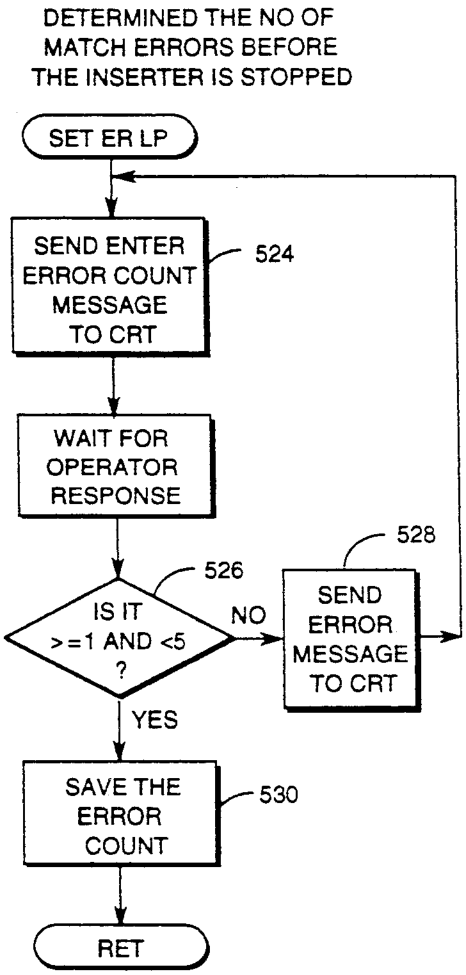
FIG. 15 is a flow diagram illustrating operations performed by a set the error count aspect of the present invention.

If it is determined from decision block 512 of FIG. 14A, that the response from the operator is to set the error count, then a subroutine labelled SET_ER_LP is called. The SET_ER_LP subroutine is illustrated in a flow chart form in FIG. 15. This feature allows minor errors in reading caused by mechanical tolerances or excessive skew, etc. to occur without the reduction in productivity caused by excessive transport stops. At block 524, a message is sent to the CRT/keyboard terminal asking the operator to enter the desired error count. At decision block 526, the determination is made as to whether the operator's response is an integer greater than or equal to one and less than five. If the operator's response is neither one, two, three, nor four, an error message is set to the CRT/keyboard terminal at block 528, and the count prompt is again sent to the CRT/keyboard terminal at block 524. If, from decision block 526, it is determined that the operator's response is either one, two, three, or four, then the master processing unit saves the desired error count at block 530 and program control is returned to the master executive routine. The valid value saved at block 530 will be used by the system when operating to assemble mass mail items.

Figure 16:
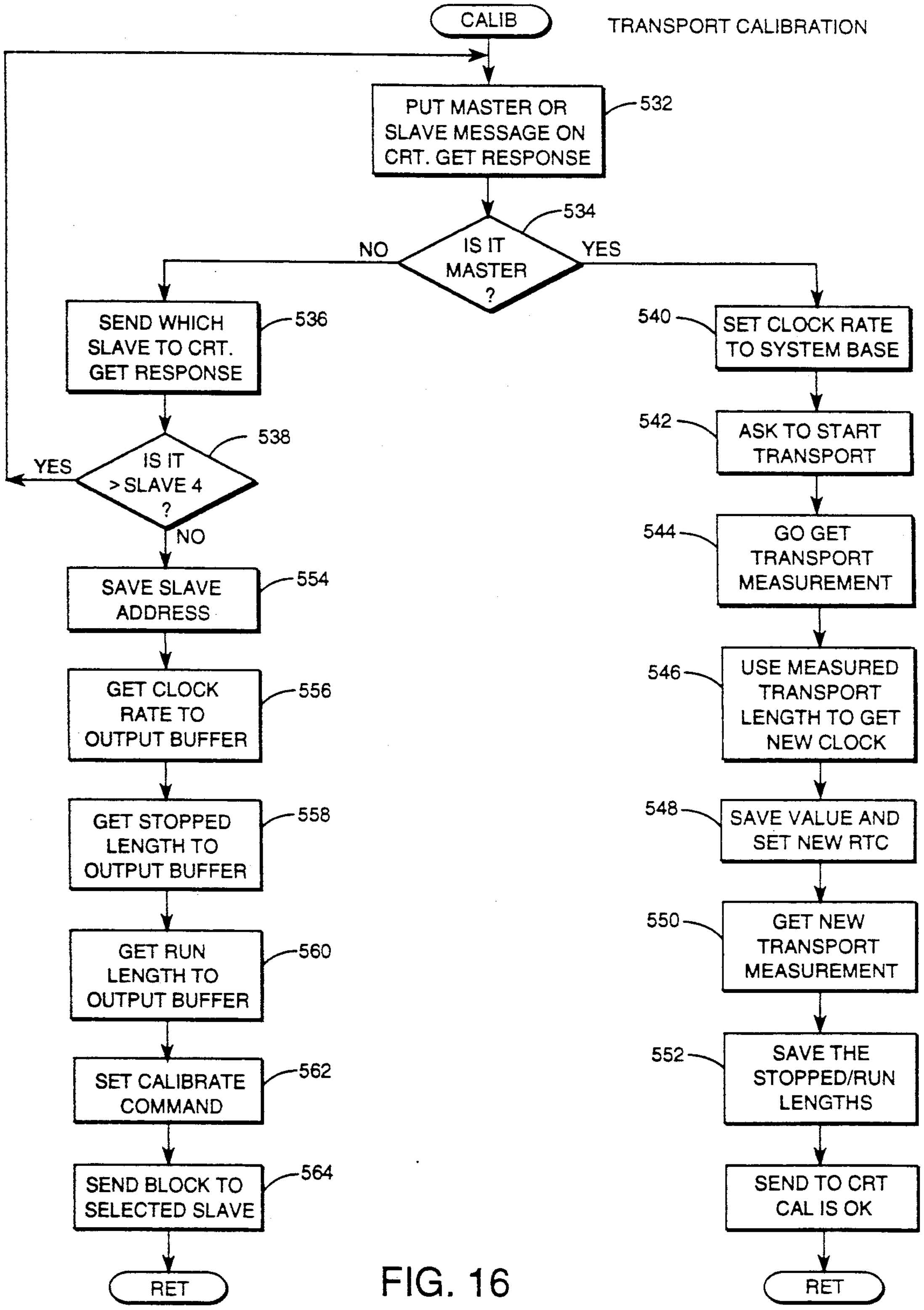
FIG. 16 is a flow diagram illustrating operations performed by a transport calibration aspect of the present invention.

If, at decision block 516 of FIG. 14A, it is determined that the operator's response is to calibrate the transport speed, a subroutine labelled CALIB is called. FIG. 16 illustrates in flow diagram form the CALIB subroutine. The purpose in this subroutine is to allow the master processing unit to set the real time clock so that one cycle of the real time clock equates to 1/10 of an inch of transport motion. This calibration is critical in finding the location of the area on a given mail item where the sequence indicator is to be found. At block 532, a master processing unit sends a prompt to the CRT/keyboard terminal asking the operator to enter either a "master" or "slave" indication of which processing unit the operator desires the real time clock to be set. At decision block 534, a determination is made as to whether the operator has responded with the response of "master". If not, at block 536, the master processing unit sends a prompt to the CRT/keyboard terminal asking the operator to enter a number of a particular slave the real time clock of which is to be set. At decision block 538, a determination is made as to whether the operator's response is an integer which is greater than 4. If so, than it is an invalid slave specification, and the control returns to block 532.

Returning now to decision block 534, if it is determined that it is the master processing unit the real time clock of which is to be set, then at block 540 the real time clock rate is set to a base value which will equate to a clock period lasting much shorter than 1/10 of an inch of transport motion. At block 542, the operator is requested to start the transport mechanism. At block 544, the master processing unit counts the number of real time clock pulses occurring during the period of the transport cycle during which the transport is stopped as well as the number of real time clock pulses occurring during the portion of the transport cycle during which the transport is running. At block 546, the master processing unit uses the counts obtained at block 544 to calculate a real time clock which would equate to 1/10 of an inch of transport motion. At block 548, the master processing unit sets the real time clock rate to equal the calculated value. At block 550, the master processing unit measures, in terms of the new real time clock, the number of real time clock periods during which the transport is stopped and running. At block 552, these stopped and run lengths are saved for use by the interrupt handling routine in detecting transport motion errors as described above. Control is then returned to the master executive routine.

Returning now to decision block 538, if an appropriate slave number is returned from the operator, that number is saved at block 554. At block 556 the real time clock rate set at block 548 is placed in a buffer for transfer to the selected slave. At block 558, a stopped length saved at block 552 is sent to a buffer for transfer to the selected slave. At block 560, a run length saved at block 552 is sent to a buffer for transfer to the selected slave. At block 562, the "slave calibrate" command is sent to the selected slave, along with the buffered values which are sent at block 564. Control is, then returned to the master executive routine of FIGS. 14A and 14B.

Figure 17:
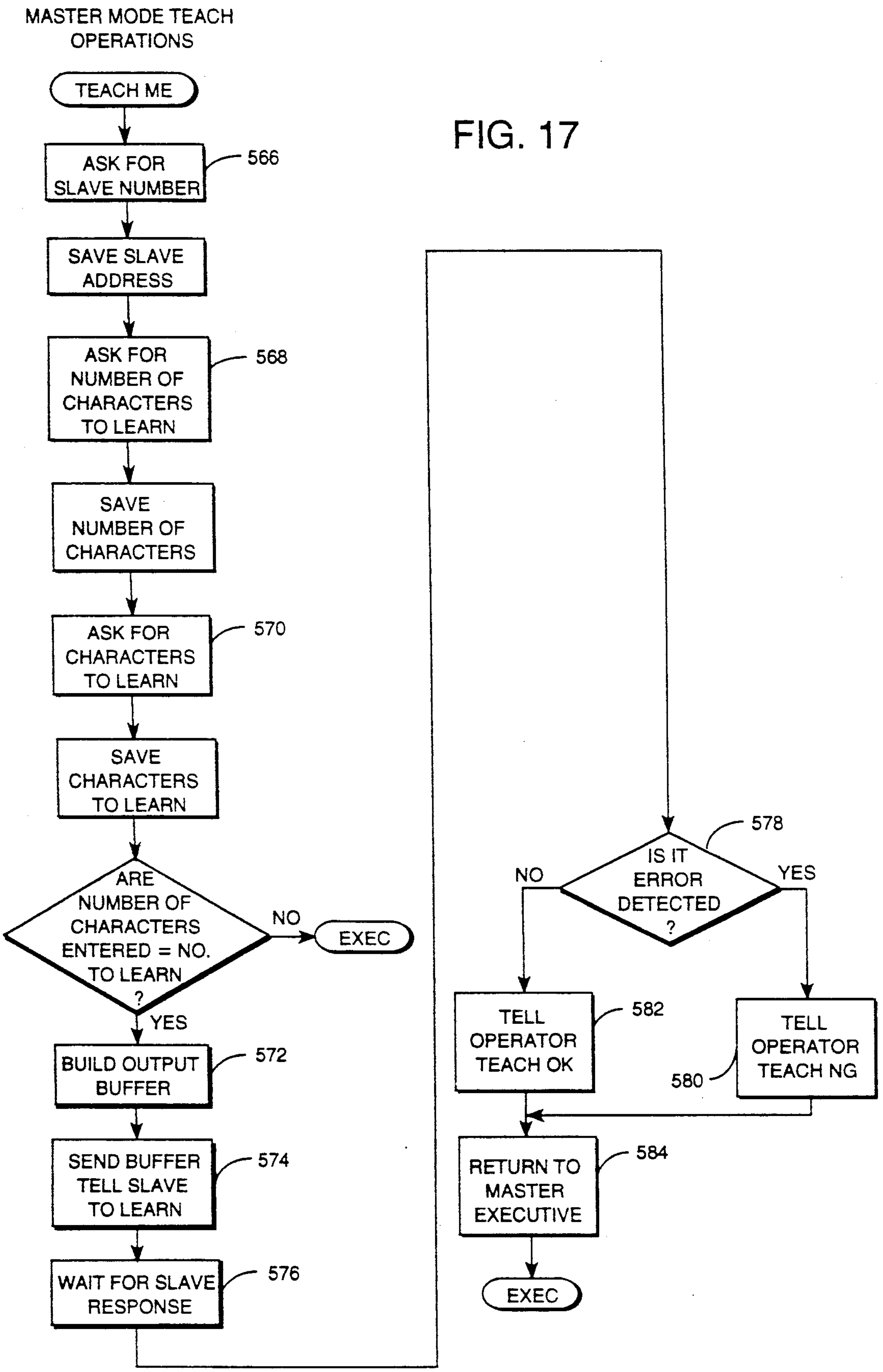
FIG. 17 is a flow diagram illustrating operations performed by a master teach aspect of the present invention.

If, from decision block 518 of FIG. 14A, it is determined that the operator's response is to learn a font, then control passes to the TEACHME subroutine illustrated in flow diagram form in FIG. 17. While it is the slave processing units that actually perform a recognition of sensed sequence indicator characters, it is the master that interfaces with the operator. Therefore, it is the master processing unit that act as the teacher when a given slave processing unit is learning a particular font. At block 566, the operator is prompted for a number of a slave to be taught. At block 568, the operator is prompted for the number of characters in a string of characters being used to teach the slave processing unit. At block 570, the operator is prompted to enter the actual string of characters which will be provided to the slave processing unit in learning a font. At block 572, the number of characters and the characters themselves to be taught to a given slave are placed in a buffer. At block 574, the master processing unit issues a command through the appropriate slave processing unit, instructing a slave to learn the font. Also, at block 574, the buffer created at block 572 is also sent to the selected slave. The master processing unit waits at block 576 while the selected slave executes the TEASLV routine shown in FIGS. 8A and 8B.

At decision block 578, a determination is made as to whether the response from slave processing unit in question is such that an error was detected in operation. If so, at block 580, a message is sent to the CRT/keyboard terminal to inform the operator that the teach operation was unsuccessful. If, at decision block 578, it is determined that no error was detected, then at block 582, a message is sent to CRT/keyboard terminal to inform the operator that the teach function was performed successfully. In either case, at block 584, control is returned to the master executive routine.

Figures 18, 19:
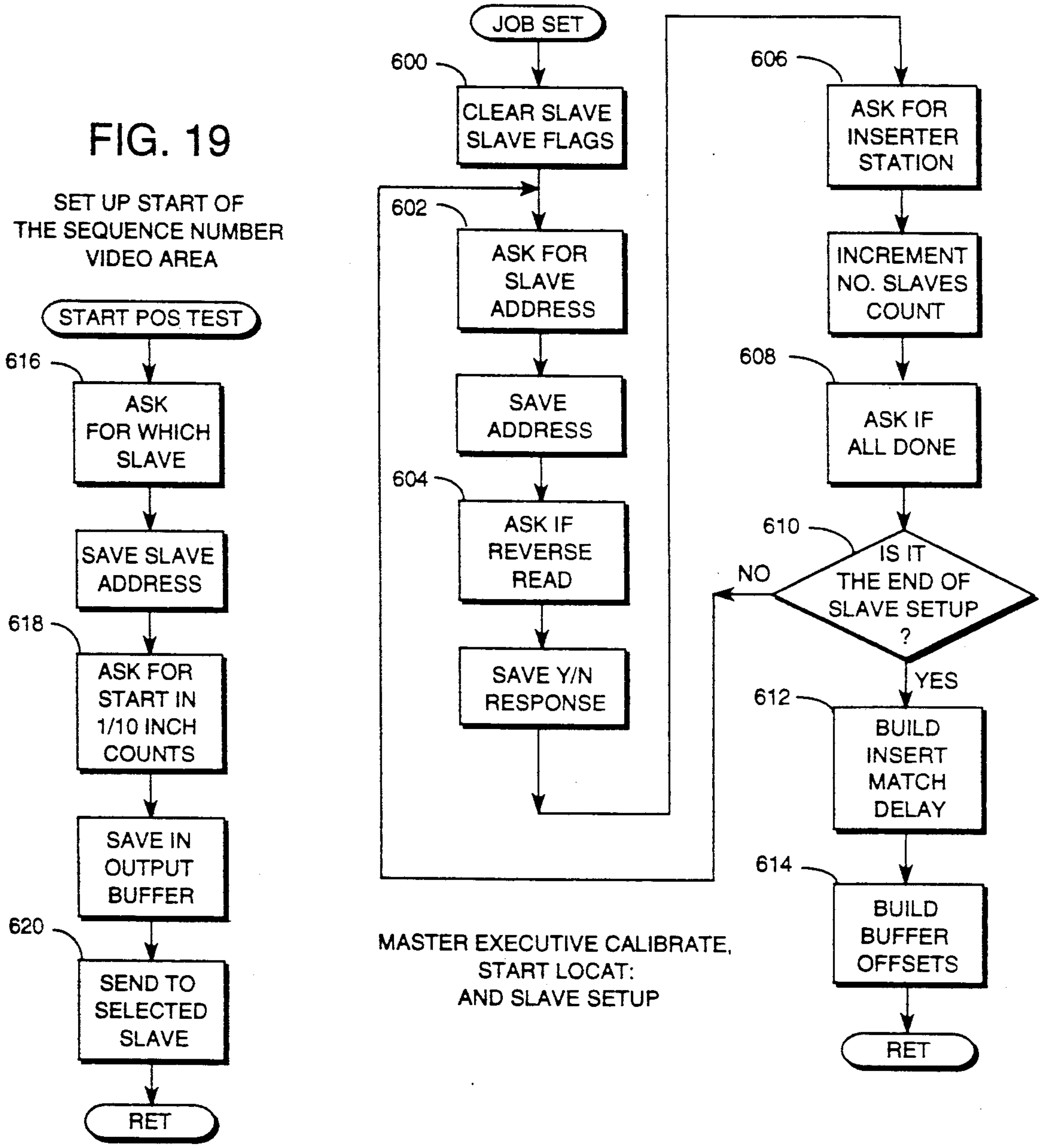
FIG. 18 is a flow diagram illustrating operations performed by a slave definition aspect of the present invention.
FIG. 19 is a flow diagram illustrating operations performed by a master starting position aspect of the present invention.

If it is determined from decision block 520 of FIG. 14B that the operator's response to the menu is a request of a job set up, then the subroutine labelled JOB_SET is called. The JOB_SET subroutine is illustrated in flow diagram form in FIG. 18. In performing the JOB_SET subroutine, the master processing unit configures the system for a new mass mail assembly job. At block 600, the master processing unit clears an area of its memory which contains certain data for each of the slaves which are involved in the function of the matching system. This is performed because not all slave processing units are necessarily used in all matching operations. That is, it is possible to use the system of the present invention with as few as two video cameras. In the embodiment described here, four video cameras are available for use in matching up to four personalized items, though the theoretical upper limit on the number of video cameras which may be employed is established by the memory capacity of the master processing unit, and may be as high as 256, for example, in the described embodiment. As is therefore apparent, a system according to the present invention is useful not only for the matched assembly of personalized mass mail items, but also for matched assembly of any set of items bearing common variable information. At block 602, the master processing unit prompts the operator to enter the number of a slave processing unit to be used in a current job being set up. The entered slave number is then used as a pointer to a block of memory reserved for its configuration. The first byte of that block is modified to indicate that the slave identified is active in the matching process being set up. At block 604, the master processing unit prompts the operator to enter an indication of whether the identified slave will be used in a "reverse read" format. This is to provide for the situation in which a given piece of mail is being carried down the transport mechanism backwards.

At block 606, the operator is prompted to enter a number of inserter station at which the video camera associated with the identified slave is located. This is necessary because all of the pieces to be assembled into a given mail item are not read at the same time because as to collate the components for a given mail item takes a number of transport cycles, with each cycle providing an opportunity to sense a sequence identifier on another component of any give mail item. Accordingly, first in first out buffers are created for storing the sensed sequence indicators, and the length of any given buffer depends upon the transport station at which the associated video camera is located. At block 608, the operator is prompted to indicate whether all of the slaves have been set up. At decision block 610, a determination is made as to whether the slave set up is finished, based upon the response to the prompt generated at block 608. If not, control returns to block 602 and continues from there again. If, from decision block 610, it is determined that the slave set up is done, then the delay values and buffer lengths described above are set up at blocks 612 and 614. Control is then returned to the master executive routine of FIGS. 14A and 14B.

If, from decision block 522 of FIG. 14B, it is determined that the response from the operator is to set the position for video capture, then a subroutine labelled START_POS_TEST is called. The START_POS_TEST subroutine is illustrated in flow diagram form in FIG. 19. At block 616, the operator is prompted for an identification of the slave for which the start position is to be set. At block 618, the master processing unit prompts the operator for an indication of the starting edge of the window of video to be captured by the video camera associated with that processor. The operator enters the requested value, in tenths of an inch, and, at block 620 the master processing unit sends the entered value to the selected slave. Program control is returned at this point to the master executive routine of FIGS. 14A and 14B.

If it is d from decision block 514 of FIG. 14A, that the operator's response is to begin the matching system in a mass mail assembly production mode, then a subroutine labelled MENU3A2 is called. The MENU3A2 subroutine is illustrated in a flow diagram form in FIGS. 20A and 20B. This subroutine actually controls the operation of the matching system of the present invention when operating in a mass mail assembly production mode. At block 622, the master processing unit verifies that the transport mechanism is running and that all error detection capabilities are functioning properly. At block 624, a match error count is cleared. At decision block 625, the determination is made as to whether the current cycle is one to command a slave processing unit to sense a sequence indicator on a mail piece or to command a slave processing unit to send a sensed sequence indicator to the master processing unit. If the current cycle is one to command a slave processing unit to sense a sequence indicator on a mail piece, the address of the first slave is obtained at block 626. At decision block 628, a determination is made as to whether the slave addressed in block 626 is active. If so, at block 630, that slave is commanded to sense a sequence indicator. Next, or if from decision block 628 it is determined that the slave was not active, then, at block 632, the slave address is incremented. At decision block 634, the determination is made as to whether the slave address is one more than the maximum allowable number. If not, control is returned to block 626 and the flow continues from there as described above. Once all active slaves have been commanded to sense a sequence indicator control flows from decision block 634 to block 636 where the slave address is reset. At block 638, the master processing unit waits until the end of the current transport cycle at which time control returns to decision block 625.

If from decision block 625 it is determined that the current cycle is one to command the slave processing units to send to the master their sensed sequence indicators, then control will pass to block to 640, where the same sequence of slave addressing is then performed as was performed for the read cycle at blocks 626 through 636. The difference here is that the command being sent to the slaves is to send the sensed sequence indicators back to the master. The master processing unit subsequently places each sensed sequence indicator into a rotating buffer established for each respective slave processing unit. At decision block 642, a test is performed to determine whether a match delay, created at block 612 of FIG. 15, has expired. If not, the master processing unit waits for the end of the current transport cycle at block 644 and returns to the read/send loop beginning with decision block 625. The match delay exists because, as described above, with a transport mechanism of the type shown in FIG. 1, it is not possible to make a determination of whether all components for a given mail item match until the sequence indicators on all such components have been sensed. If the delay has expired, the subroutine labelled MATCH_DOC is called at block 646.

Figure 20B:
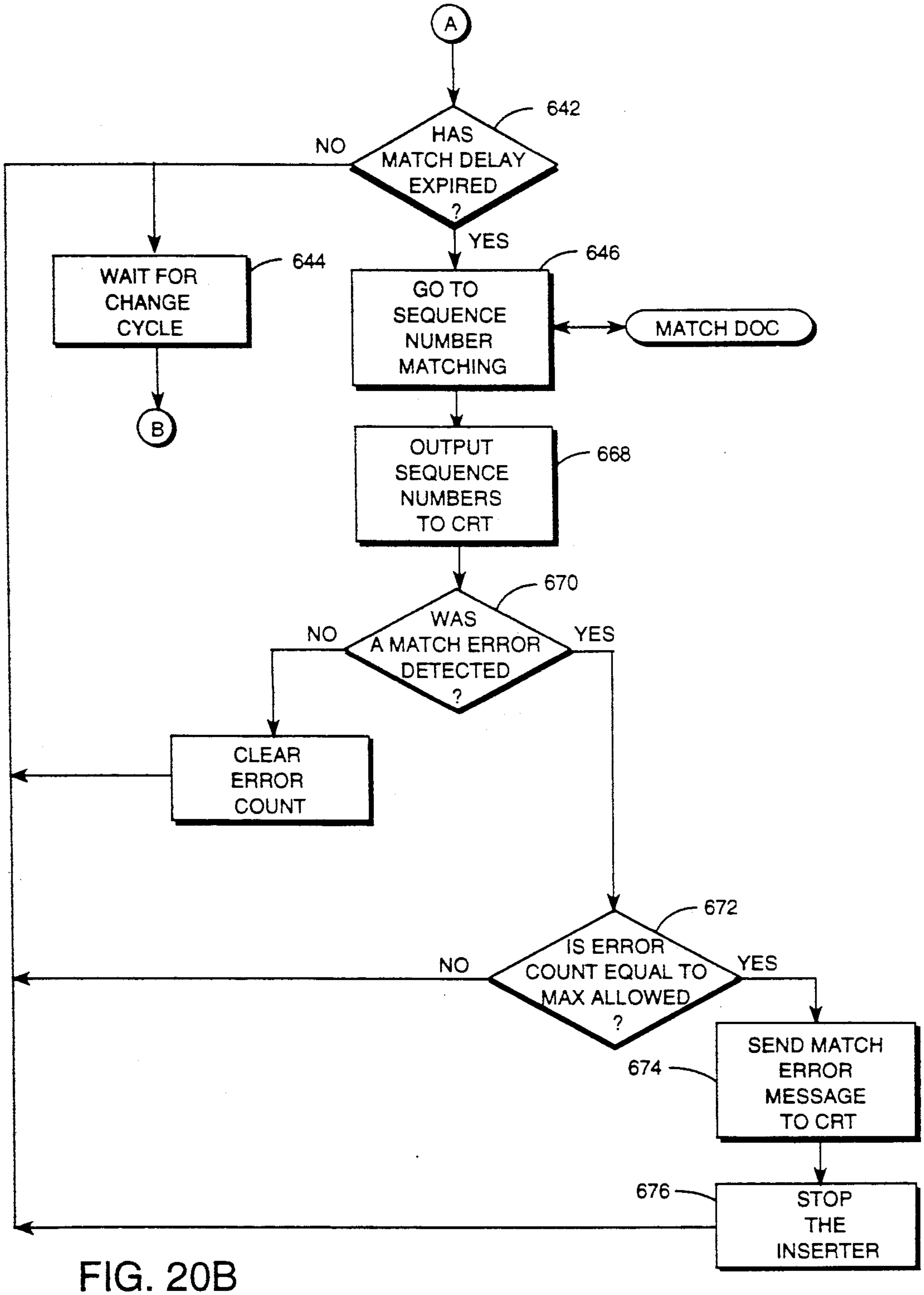
Figure 21:
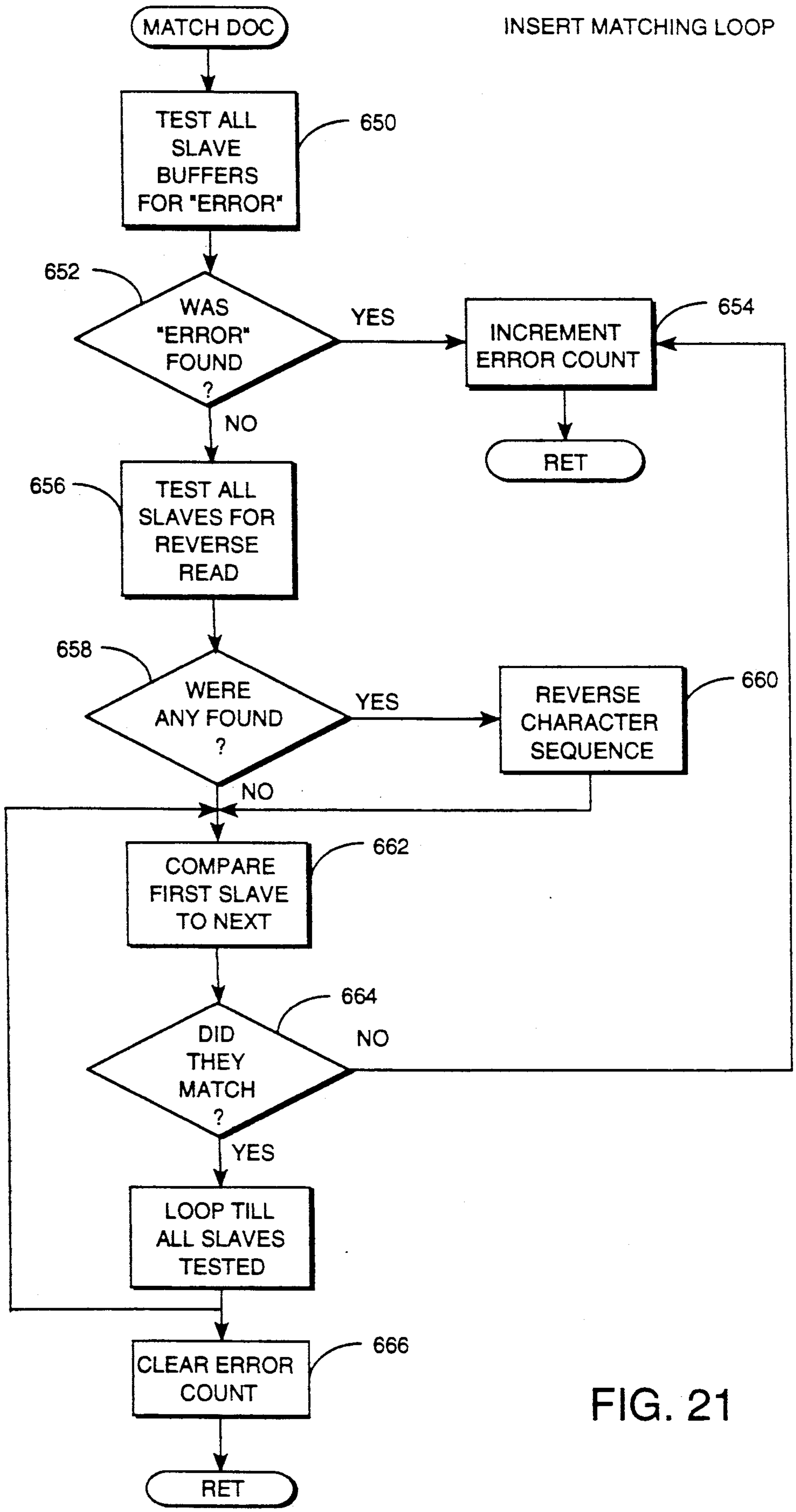
FIG. 21 is a flow diagram illustrating operations performed by a master matching subroutine aspect of the present invention.

The MATCH_DOC subroutine is illustrated in flow chart form in FIG. 21. At block 650, a test is made to determine whether any active slaves report an error condition. At decision block 652, the determination is made as to whether any such slaves have reported an error condition. If so, the error count is incremented at block 654 and control is returned to block 646 of FIG. 20B. If, however, from decision block 652 it is determined that no error condition is reported, all slaves are tested, at block 656, for a "reverse read" flag which might have been set at block 604 at FIG. 18. At decision block 658 a determination is made as to whether any "reverse read" flags were found, and, if so, the involved slave buffers are reversed at block 660. The matching process begins at block 662 where a sensed sequence indicator from the first slave is compared to that of the next. At decision block 664, a determination is made as to whether the compared sequence indicators match, and, if they do not, the error count is incremented at block 654, and control is returned to block 646 of FIG. 20B. If they do not match, then control returns to block 662 at which the next subsequent slave's sequence indicator is compared to the previous one's. If a mismatch occurs, the error count is incremented at block 654, and if all slaves match, the error count is cleared at block 666 and control is then returned to block 648 of FIG. 20B.

At block 668 of FIG. 20B, the sensed sequence indicators for a mail item being matched are displayed to the operator on the CRT/keyboard terminal. This display, which continues while production continues, assists the operator in the physical correction of mismatched items should a mismatch occur. At decision block 670, a determination is made as to whether a match error has been detected. If so, the determination is made at decision block 672 as to whether the error count is equal to the maximum allowed as set by the operator at block 530 of FIG. 15. If so, at block 674, the master processing unit sends a match error message to the CRT/keyboard display, and at block 676, the run/stop relay 68 of FIG. 2 operates to cause the transport mechanism of the inserter device to stop. If no match error is detected, from decision block 670, or the error count is less than the maximum allowed, from decision block 672, then the master processing unit waits, at block 644, for the end of the current transport cycle, at which time control passes back to decision block 625. If the transport mechanism is stopped at block 676, the interrupt handling program illustrated In FIGS. 6A and 6B will ultimately detect the transport motion error and then force program execution into error recovery.

The above illustrative embodiment depicts a matching system for use with an inserting device for assembling mass mail items. It can be adapted for use with any type of inserting device having a transport mechanism as generally illustrated in FIG. 1. Each aspect of the system being exemplary, the scope of the invention is not intended to be limited to the specific embodiments as shown or described. Instead, the scope of the invention is intended to encompass those modifications and variations that may be apparent to those persons skilled in the art to which the subject matter pertains.

What is claimed is:

1. A matching system for use with an inserting device adapted to insert into an envelope component at least one mail component, a plurality of the components personalized for a predetermined recipient, said matching system comprising:

- a plurality of video cameras, each of said cameras positioned to sense an alpha-numeric sequence indicator on a corresponding one of said personalized components, creating an electrical signal in accordance with the sensed indicator, the sequence indicator corresponding to the predetermined recipient for whom that component is personalized
- means for processing the electrical signal from each of said cameras to develop a digital representation of that signal and for storing said digital representation; and
- control means for receiving said stored digital representations and for determining therefrom whether the sequence indicators on the personalized components match.

2. A matching system for use with an inserting device for assembling mass mail items, the inserting device having a transport mechanism adapted to receive a succession of envelope pieces and at least one succession of mail pieces and to collate and insert into each envelope piece a mail piece from each succession of mail pieces, a plurality of the pieces for assembly into an item of mass mail being personalized for a predetermined recipient, said matching system comprising:

- a plurality of video cameras, each of said cameras positioned to sense an alpha-numeric sequence indicator on a corresponding one of said personalized pieces, creating an electrical signal in accordance with the sensed indicator, the sequence indicator corresponding to the predetermined recipient for whom that area is personalized;
- means for processing the electrical signal from each of said cameras to develop a digital representation of that signal and for storing said digital representation; and control means for receiving said stored digital representations and for determining therefrom whether the sequence indicators, on the personalized pieces to be assembled into an item of mass mail, match.

3. The matching system recited in claim 2 further comprising:

means for maintaining a count of the number of consecutive mismatch occurrences; and means for rendering the transport mechanism inoperative in the event of said count reaching a predetermined value.

4. The matching system of claim 2 wherein said control means comprises:

a plurality of slave processing units, each of which adapted to receive a stored digital representation of the signal from one of said video cameras and to determine therefrom the sequence indicator sensed by that camera; and a master processing unit adapted to receive from said slave processing units the sequence indicators sensed by said video cameras and to determine therefrom whether the sequence indicators, on the personalized pieces to be assembled into an item of mass mail, match.

5. A method for use with an inserting device for assembling mass mail items, the inserting device having a transport mechanism adapted to receive a succession of envelope pieces and at least one succession of mail pieces and to collate and insert into each envelope piece a mail piece from each succession of mail pieces, a plurality of the pieces for assembly into an item of mass mail being personalized for a predetermined recipient, the method comprising the steps of:

sensing a window of video information at a predetermined location on each personalized piece, each personalized piece having at said predetermined location an alpha-numeric sequence indicator corresponding to the predetermined recipient for whom that piece is personalized;

generating a digital representation of each window of sensed video information;

processing each digital representation to provide a sensed sequence indicator corresponding thereto;

comparing the sensed sequence indicators to determine whether said sensed sequence indicators match;

maintaining a count of the number of consecutive mismatch occurrences; and rendering the transport mechanism inoperative in the event of said count reaching a predetermined value.

6. A matching system for assembling mass mail items, each of said items having an envelope portion and at least one insert portion, a plurality of said portions personalized for a predetermined recipient, each of said personalized portions having printed in a predetermined font at a predetermined location thereon an alpha-numeric sequence indicator corresponding to that recipient, said matching system comprising:

means for learning the predetermined font of said sequence indicator of each personalized portion;

means for learning the predetermined location of said sequence indicator of each personalized portion;

means for sensing a window of video information at the predetermined location on each personalized portion;

means for generating a digital representation of each window of sensed video information;

means for processing each digital representation to provide a sensed sequence indicator corresponding to the predetermined recipient for whom each portion is personalized; and means for comparing the sensed sequence indicators to determine whether said sensed sequence indicators match.

7. A matching system for use with an inserting device for inserting into an envelope a mail item comprising at least one mail piece, said inserting device of the type having a movable cycling envelope transport, a movable cycling insert transport and at least one stack of like mail pieces adjacent said insert transport, each of said stacks caused with each transport cycle to dispense a mail piece onto the top of any other mail pieces on said insert transport at a transport station adjacent thereto, said insert transport operative for assembling said mail item by conveying assembled mail pieces to successive transport stations adjacent successive stacks where successive mail pieces are dispensed onto the top thereof, and said envelope transport operative for conveying a succession of envelopes to a stuffing station whereat said mail item is inserted into an envelope, said matching system comprising:

a first video camera, positioned at a first insert transport station adjacent a stack of mail pieces wherein each piece is personalized for a predetermined recipient and bears an alpha-numeric sequence indicator corresponding thereto, said first camera able to sense a first alpha-numeric sequence indicator on a mail piece dispensed from said stack of personalized mail pieces onto the top of any other mail pieces at said first insert transport station, said first camera creating an electrical signal in accordance with the first sensed indicator;

a second video camera, positioned at an envelope transport station through which passes a succession of envelopes wherein each is personalized for a predetermined recipient and bears an alpha-numeric sequence indicator corresponding thereto, said second camera able to sense a second alpha-numeric sequence indicator on an envelope at said envelope transport station, said second camera creating an electrical signal in accordance with the second sensed indicator;

means for processing the electrical signal from each of said cameras to develop a digital representation of that signal and for storing said digital representation; and control means for receiving said stored digital representations and for determining therefrom whether the sensed indicator on the personalized mail piece matches that of the envelope into which it is to be inserted.

8. A matching system for use with an inserting device for inserting into an envelope a mail item comprising at least one mail piece, said inserting device of the type having a movable cycling envelope transport, a movable cycling insert transport and at least one stack of like mail pieces adjacent said insert transport, each of said stacks caused with each transport cycle to dispense a mail piece onto the top of any other mail pieces on said insert transport at a transport station adjacent thereto, said insert transport operative for assembling said mail item by conveying assembled mail pieces to successive transport stations adjacent successive stacks where successive mail pieces are dispensed onto the top thereof, and said envelope transport operative for conveying a succession of envelopes to a stuffing station whereat said mail item is inserted into an envelope, said matching system comprising:

a first video camera, positioned at a first insert transport station adjacent a stack of mail pieces wherein each piece is personalized for a predetermined recipient and bears an alpha-numeric sequence indicator corresponding thereto, said first camera able to sense a first alpha-numeric sequence indicator on a mail piece dispensed from said first stack of personalized mail pieces onto the top of any other mail pieces at said first insert transport station, said first camera creating an electrical signal in accordance with the first sensed indicator;

a second video camera, positioned at a second insert transport station adjacent a second stack of mail pieces wherein each is personalized for a predetermined recipient and bears an alpha-numeric sequence indicator corresponding thereto, said second camera able to sense a second alpha-numeric sequence indicator on a mail piece dispensed from said second stack of personalized mail pieces onto the top of any other mail pieces at said second insert transport station, said second camera creating an electrical signal in accordance with the second sensed indicator;

means for processing the electrical signal from each of said cameras to develop a digital representation of that signal and for storing said digital representation; and control means for receiving said stored digital representations and for determining therefrom whether the sensed indicators on the personalized mail pieces assembled into a single mail item match.

* * * * *

UNITED STATES PATENT AND TRADEMARK OFFICE
CERTIFICATE OF CORRECTION

PATENT NO. : 5,067,088

DATED : November 19, 1991

INVENTOR(S) : Edward M. Schneiderhan

It is certified that error appears in the above-identified patent and that said Letters Patent is hereby corrected as shown below:

On the title page:

In the abstract, line 11, delete "camera" and substitute therefor --cameras--;

Column 3, line 64, after "envelope" insert --.--;

Column 3, line 65, after "envelope" insert --.--;

Column 6, line 40, delete "SR" and substitute therefor --S/R--;

Column 7, line 50, delete "syhchronous" and substitute therefor --synchronous--;

Column 8, line 44, delete "sychronously" and subsitute therefor --synchronously--;

Column 9, line 13, delete "SR" and substitute therefor --S/R--;

Column 9, line 40, after "inactive" insert --.--;

Column 11, line 8, delete "344" and substitute therefor --340--;

Column 11, line 11, "delete "348" and substitute therefor --338--;

UNITED STATES PATENT AND TRADEMARK OFFICE
CERTIFICATE OF CORRECTION

PATENT NO. : 5,067,088 Page 2 of 3

DATED : November 19, 1991

INVENTOR(S) : Edward M. Schneiderhan

It is certified that error appears in the above-identified patent and that said Letters Patent is hereby corrected as shown below:

Column 11, line 17, delete "series" and substitute therefor --serves--;

Column 12, line 61, after "the" insert --master an ASCII character string of the characters to be--;

Column 13, line 1, delete "than" and substitute therefor --then--;

Column 13, line 3, delete "START UP" and substitute therefor --START_UP--;

Column 13, line 37, after "60" insert --shown in Fig. 2. The function at block 450 serves to--;

Column 16, line 64, after "is" delete the comma;

Column 17, line 5, delete "act" and substitute therefor --acts--;

Column 18, line 42, delete "d" and substitute therefor --determined--;

UNITED STATES PATENT AND TRADEMARK OFFICE
CERTIFICATE OF CORRECTION

PATENT NO. : 5,067,088

DATED : November 19, 1991

INVENTOR(S) : Edward M. Schneiderhan

It is certified that error appears in the above-identified patent and that said Letters Patent is hereby corrected as shown below:

Column 19, line 54, delete "not";

Column 19, line 59, delete "648" and substitute therefor --646--;

Column 20, line 40, after "personalized" insert --;--;

Column 20, line 64, delete "area" and substitute therefor --piece--;

Column 23, line 5, after "a" insert --first--; and

Column 23, line 17, after "each" insert --piece--.

Signed and Sealed this

Twelfth Day of October, 1993

Attest:

Bruce Lehman

BRUCE LEHMAN

*Attesting Officer*

*Commissioner of Patents and Trademarks*